(12) United States Patent
Zhou et al.

(10) Patent No.: US 11,963,031 B2
(45) Date of Patent: Apr. 16, 2024

(54) TECHNIQUES FOR RECEIVER-SPECIFIC NETWORK CODING REDUNDANCY

(71) Applicant: QUALCOMM Incorporated, San Diego, CA (US)

(72) Inventors: Shanyu Zhou, San Diego, CA (US); Jelena Damnjanovic, Del Mar, CA (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/406,982

(22) Filed: Aug. 19, 2021

(65) Prior Publication Data

US 2023/0055926 A1 Feb. 23, 2023

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC .... H04W 24/10; H04W 24/08; H04L 1/0026; H04L 1/0075; H04L 1/0076; H04L 1/0009
See application file for complete search history.

(56) References Cited

U.S. PATENT DOCUMENTS

| | | | |
|---|---|---|---|
| 2015/0095739 A1 | 4/2015 | Zhovnirnovsky et al. | |
| 2016/0205586 A1* | 7/2016 | Kim | H04L 1/1835 370/230 |
| 2016/0269260 A1* | 9/2016 | Kazmi | H04L 1/20 |
| 2018/0234116 A1* | 8/2018 | Shi | H04N 7/24 |
| 2018/0331781 A1 | 11/2018 | Welin et al. | |

(Continued)

FOREIGN PATENT DOCUMENTS

GB 2482991 A 2/2012

OTHER PUBLICATIONS

Dai J., et al., "LT Codes with Limited Feedback", 2014 IEEE International Conference on Computer and Information Technology, IEEE, Sep. 11, 2014, pp. 669-673, XP032702894, 5 Pages, Sections I-III, Section III.

(Continued)

*Primary Examiner* — Chi H Pham
*Assistant Examiner* — Raul Rivas
(74) *Attorney, Agent, or Firm* — Holland & Hart LLP

(57) ABSTRACT

Methods, systems, and devices for wireless communications are described. Generally, a transmitting device may support receiver-specific network coding redundancy techniques. For example, a transmitting device may select a receiver-specific redundancy configuration for transmission to a particular receiver based on a quality of a link between the transmitting device and the receiving device. The transmitting device may select or calculate a user-specific redundancy for the link based on a received packet loss probability report, or may select the preferred redundancy configuration as indicated in a request received from the receiving device, or may network encode and transmit one or more initial transmissions according to a default redundancy configuration and increment or decrement the default redundancy based on feedback from the receiving device.

29 Claims, 14 Drawing Sheets

(56) References Cited

U.S. PATENT DOCUMENTS

| | | | |
|---|---|---|---|
| 2019/0098640 A1* | 3/2019 | Holakouei | H04W 28/0231 |
| 2019/0373557 A1* | 12/2019 | Agardh | H04W 52/0267 |
| 2020/0195376 A1* | 6/2020 | Zhang | H04L 1/0046 |

OTHER PUBLICATIONS

International Search Report and Written Opinion—PCT/US2022/037760—ISA/EPO—dated Nov. 4, 2022.

* cited by examiner

TECHNIQUES FOR RECEIVER-SPECIFIC NETWORK CODING REDUNDANCY

FIELD OF TECHNOLOGY

The following relates to wireless communications, including techniques for receiver-specific network coding redundancy.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for receiver-specific network coding redundancy. Generally, transmitting device (e.g., a user equipment (UE) or a base station) may support receiver-specific network coding redundancy techniques. For example, a transmitting device may select a receiver-specific redundancy configuration (e.g., an amount of redundancy for a transmission of one or more packets) for transmission to a particular receiver based on a quality (e.g., a packet loss probability) of a link between the transmitting device and the receiving device. The transmitting device may receive a packet loss probability report from the receiving device, indicating a quality of the link. The transmitting device may select or calculate a receiver-specific redundancy for the link based on the received packet loss probability report. In some examples, the transmitting device may receive an indication of a preferred redundancy configuration from the receiving device, and may select the preferred redundancy configuration as indicated. In some examples, the transmitting device may network encode and transmit one or more initial transmissions according to a default redundancy configuration, and may increment or decrement the default redundancy based on feedback from the receiving device.

A method for wireless communications at a transmitting device is described. The method may include determining a quality level of a link between the transmitting device and a receiving device based on one or more messages communicated over the link, selecting a first receiver-specific redundancy configuration of a set of multiple redundancy configurations based on the quality level, network encoding one or more data packets for transmission to the receiving device according to the first receiver-specific redundancy configuration, and transmitting, to the receiving device, the one or more data packets based on the network encoding.

An apparatus for wireless communications at a transmitting device is described. The apparatus may include a processor, memory coupled with the processor, and instructions stored in the memory. The instructions may be executable by the processor to cause the apparatus to determine a quality level of a link between the transmitting device and a receiving device based on one or more messages communicated over the link, select a first receiver-specific redundancy configuration of a set of multiple redundancy configurations based on the quality level, network encode one or more data packets for transmission to the receiving device according to the first receiver-specific redundancy configuration, and transmit, to the receiving device, the one or more data packets based on the network encoding.

Another apparatus for wireless communications at a transmitting device is described. The apparatus may include means for determining a quality level of a link between the transmitting device and a receiving device based on one or more messages communicated over the link, means for selecting a first receiver-specific redundancy configuration of a set of multiple redundancy configurations based on the quality level, means for network encoding one or more data packets for transmission to the receiving device according to the first receiver-specific redundancy configuration, and means for transmitting, to the receiving device, the one or more data packets based on the network encoding.

A non-transitory computer-readable medium storing code for wireless communications at a transmitting device is described. The code may include instructions executable by a processor to determine a quality level of a link between the transmitting device and a receiving device based on one or more messages communicated over the link, select a first receiver-specific redundancy configuration of a set of multiple redundancy configurations based on the quality level, network encode one or more data packets for transmission to the receiving device according to the first receiver-specific redundancy configuration, and transmit, to the receiving device, the one or more data packets based on the network encoding.

Some examples of the method, apparatuses, and non-transitory computer-readable medium described herein may further include operations, features, means, or instructions for receiving, from the receiving device, a packet loss probability report based on transmitting the one or more messages to the receiving device, where the one or more messages include one or more downlink data packets transmitted during a packet loss measurement window.

In some examples of the method, apparatuses, and non-transitory computer-readable medium described herein, network encoding a second one or more data packets for transmission to the receiving device according to a default redundancy configuration of the set of multiple redundancy configurations, transmitting, to the receiving device, the second one or more data packets based on the network encoding according to the default redundancy configuration, where the one or more messages include feedback information associated with the second one or more data packets, and adjusting the default redundancy configuration by an offset value based on receiving the feedback information, where the first receiver-specific redundancy configuration corresponds to the default redundancy configuration adjusted by the offset value.

In some examples of the method, apparatuses, and non-transitory computer-readable medium described herein, the one or more messages include one or more parameters including the default redundancy configuration, the offset value, a threshold redundancy configuration, or any combination thereof.

Some examples of the method, apparatuses, and non-transitory computer-readable medium described herein may further include operations, features, means, or instructions for transmitting, to the receiving device, control signaling including an indication of one or more parameters, where the one or more messages include control signaling including a request from the receiving device that the transmitting device network encode the one or more data packets according to the first receiver-specific redundancy configuration.

In some examples of the method, apparatuses, and non-transitory computer-readable medium described herein, transmitting the control signaling including the indication of the one or more parameters may include operations, features, means, or instructions for transmitting, to the receiving device, a radio resource control message including a set of multiple parameters including the one or more parameters and transmitting, to the receiving device, a downlink control information message including an indication of a subset of the set of multiple parameters, the subset including the one or more parameters.

Some examples of the method, apparatuses, and non-transitory computer-readable medium described herein may further include operations, features, means, or instructions for transmitting, to the receiving device based on determining that one or more conditions may be satisfied, control signaling activating receiver-specific redundancy procedures, where receiving the control signaling including the request may be based on transmitting the control signaling activating the first receiver-specific redundancy procedures.

In some examples of the method, apparatuses, and non-transitory computer-readable medium described herein, the one or more conditions include a threshold amount of available downlink resources or uplink resources or both, a threshold quality level of the link between the transmitting device and the receiving device, a processing capability of the receiving device, a processing capability of the transmitting device, or any combination thereof.

In some examples of the method, apparatuses, and non-transitory computer-readable medium described herein, a packet loss probability report, where network encoding the one or more data packets according to the first receiver-specific redundancy configuration may be based on receiving, from the receiving device, the packet loss probability report.

In some examples of the method, apparatuses, and non-transitory computer-readable medium described herein, receiving the control signaling including the indication of one or more parameters for performing receiver-specific network encoding may include operations, features, means, or instructions for receiving, from the receiving device, a radio resource control message including a set of multiple parameters including the one or more parameters and receiving, from the receiving device, a downlink control information message including an indication of a subset of the set of multiple parameters, the subset including the one or more parameters.

In some examples of the method, apparatuses, and non-transitory computer-readable medium described herein, the one or more messages may include operations, features, means, or instructions for control signaling received from the receiving device including an instruction to network encode the one or more data packets according to the first receiver-specific redundancy configuration.

Some examples of the method, apparatuses, and non-transitory computer-readable medium described herein may further include operations, features, means, or instructions for receiving, from the receiving device, control signaling activating receiver-specific redundancy procedures, where network encoding the one or more data packets according to the first receiver-specific redundancy configuration may be based on receiving the control signaling activating the first receiver-specific redundancy procedures.

Some examples of the method, apparatuses, and non-transitory computer-readable medium described herein may further include operations, features, means, or instructions for receiving, from the receiving device, control signaling deactivating receiver-specific redundancy procedures, network encoding a second one or more data packets according to a default redundancy that may be not receiver-specific based on receiving the control signaling deactivating receiver-specific redundancy procedures, and transmitting the second one or more data packets to the receiving device based on the network encoding according to the default redundancy.

A method for wireless communications at a receiving device is described. The method may include determining a quality level of a link between a transmitting device and the receiving device based on one or more messages communicated over the link, receiving, from the transmitting device via the link, one or more data packets that are network encoded according to a first receiver-specific redundancy configuration of a set of multiple redundancy configurations corresponding to the quality level, and network decoding the one or more data packets based on the first receiver-specific redundancy configuration.

An apparatus for wireless communications at a receiving device is described. The apparatus may include a processor, memory coupled with the processor, and instructions stored in the memory. The instructions may be executable by the processor to cause the apparatus to determine a quality level of a link between a transmitting device and the receiving device based on one or more messages communicated over the link, receive, from the transmitting device via the link, one or more data packets that are network encoded according to a first receiver-specific redundancy configuration of a set of multiple redundancy configurations corresponding to the quality level, and network decode the one or more data packets based on the first receiver-specific redundancy configuration.

Another apparatus for wireless communications at a receiving device is described. The apparatus may include means for determining a quality level of a link between a transmitting device and the receiving device based on one or more messages communicated over the link, means for receiving, from the transmitting device via the link, one or more data packets that are network encoded according to a first receiver-specific redundancy configuration of a set of multiple redundancy configurations corresponding to the quality level, and means for network decoding the one or more data packets based on the first receiver-specific redundancy configuration.

A non-transitory computer-readable medium storing code for wireless communications at a receiving device is described. The code may include instructions executable by a processor to determine a quality level of a link between a transmitting device and the receiving device based on one or more messages communicated over the link, receive, from the transmitting device via the link, one or more data packets that are network encoded according to a first receiver-specific redundancy configuration of a set of multiple redundancy configurations corresponding to the quality level, and network decode the one or more data packets based on the first receiver-specific redundancy configuration.

Some examples of the method, apparatuses, and non-transitory computer-readable medium described herein may further include operations, features, means, or instructions for transmitting, to the transmitting device, a packet loss probability report, where the one or more messages include one or more downlink data packets transmitted during a packet loss measurement window, where the first receiver-specific redundancy configuration may be associated with a packet loss probability for the packet loss measurement window indicated in the packet loss probability report.

Some examples of the method, apparatuses, and non-transitory computer-readable medium described herein may further include operations, features, means, or instructions for receiving, from the transmitting device, control signaling including an indication of one or more parameters for estimating the quality level of the link between the receiving device and the transmitting device, where the one or more parameters include the packet loss measurement window.

Some examples of the method, apparatuses, and non-transitory computer-readable medium described herein may further include operations, features, means, or instructions for receiving, from the transmitting device, a second one or more data packets that may be network encoded according to a default redundancy configuration of the set of multiple redundancy configurations, where the one or more messages include feedback information associated with the second one or more data packets, and where the first receiver-specific redundancy configuration includes the default redundancy configuration adjusted by an offset value.

Some examples of the method, apparatuses, and non-transitory computer-readable medium described herein may further include operations, features, means, or instructions for receiving, from the transmitting device, control signaling including an indication of one or more parameters for estimating the quality level of the link between the receiving device and the transmitting device, where the one or more messages include control signaling including a request that the transmitting device network encode the one or more data packets according to the first receiver-specific redundancy configuration based on receiving the indication of the one or more parameters, and where the one or more parameters include a packet loss measurement window, a lookup table indicating a correspondence between packet loss values and respective redundancy configurations of the set of redundancy configurations, or both.

In some examples of the method, apparatuses, and non-transitory computer-readable medium described herein, receiving the control signaling including the indication of the one or more parameters may include operations, features, means, or instructions for receiving, from the transmitting device, a radio resource control message including a set of multiple parameters including the one or more parameters and receiving, from the transmitting device, a downlink control information message including an indication of a subset of the set of multiple parameters, the subset including the one or more parameters.

Some examples of the method, apparatuses, and non-transitory computer-readable medium described herein may further include operations, features, means, or instructions for receiving, from the transmitting device, control signaling activating receiver-specific redundancy procedures, where transmitting the control signaling including the request may be based on receiving the control signaling activating the first receiver-specific redundancy procedures.

Some examples of the method, apparatuses, and non-transitory computer-readable medium described herein may further include operations, features, means, or instructions for transmitting, to the transmitting device, a packet loss probability report, where receiving the one or more data packets that may be network encoded according to the first receiver-specific redundancy configuration may be based on transmitting the packet loss probability report.

Some examples of the method, apparatuses, and non-transitory computer-readable medium described herein may further include operations, features, means, or instructions for receiving, from the transmitting device, a second one or more data packets that may be network encoded according to a default redundancy configuration, where the one or more messages include feedback information associated with the second one or more data packets, and where the first receiver-specific redundancy configuration includes the default redundancy configuration adjusted by an offset value based on the feedback information.

In some examples of the method, apparatuses, and non-transitory computer-readable medium described herein, the one or more messages may include operations, features, means, or instructions for control signaling transmitted to the transmitting device including an instruction to network encode the one or more data packets according to the first receiver-specific redundancy configuration.

Some examples of the method, apparatuses, and non-transitory computer-readable medium described herein may further include operations, features, means, or instructions for transmitting, to the transmitting device, control signaling activating receiver-specific redundancy procedures based on one or more conditions being satisfied, where receiving the one or more data packets that may be network encoded according to the first receiver-specific redundancy configuration may be based on receiving the control signaling activating the first receiver-specific redundancy procedures.

In some examples of the method, apparatuses, and non-transitory computer-readable medium described herein, the one or more conditions include a threshold amount of available downlink resources or uplink resources or both, a threshold quality level of the link between the transmitting device and the receiving device, a processing capability of the receiving device, a processing capability of the transmitting device, or any combination thereof.

DETAILED DESCRIPTION

Figure 1:
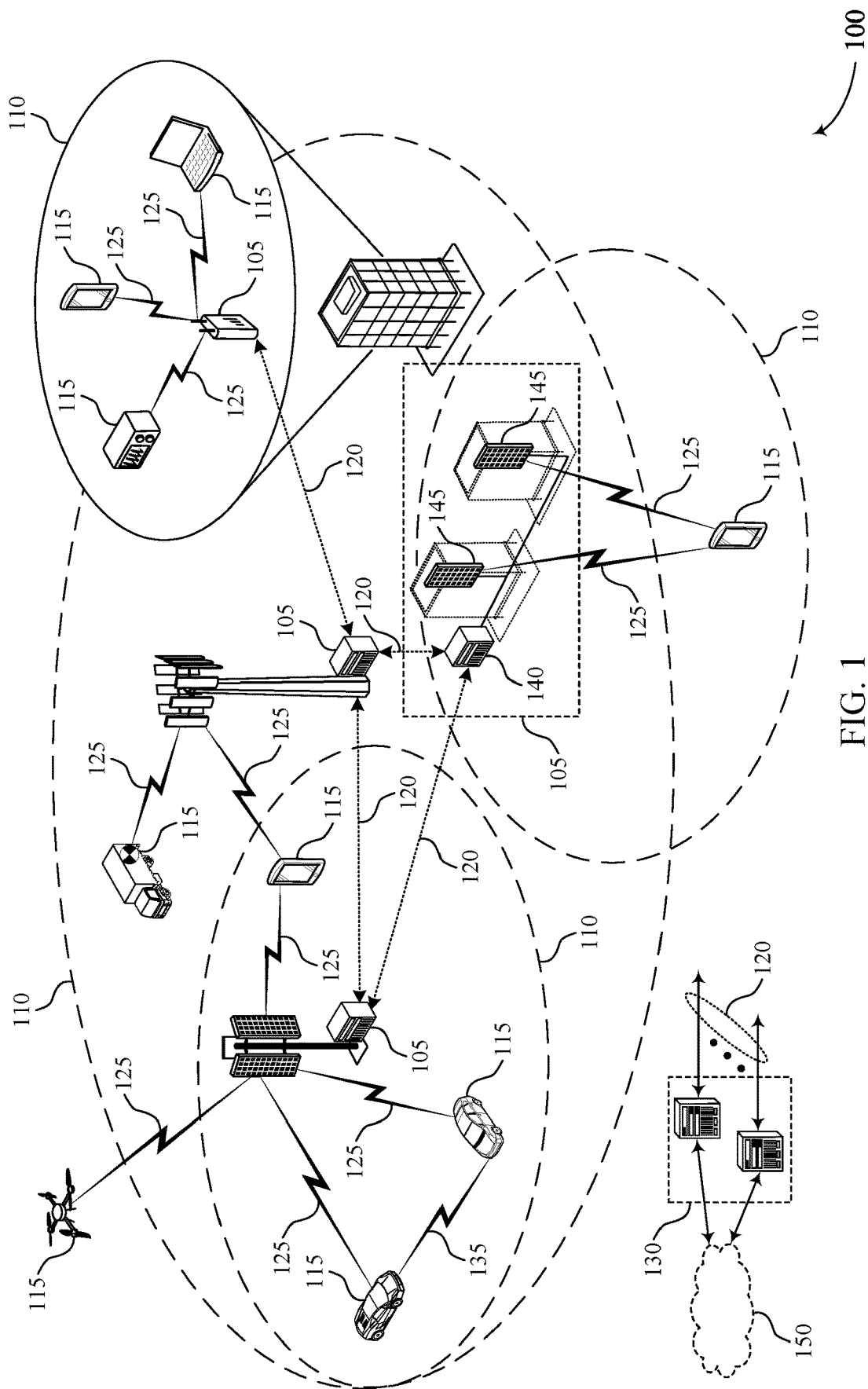
FIG. 1 illustrates an example of a wireless communications system that supports techniques for receiver-specific network coding redundancy in accordance with aspects of the present disclosure.

Some wireless communications systems may support network encoding procedures. In such procedures, a transmitting device (e.g., a UE or a base station) may encode a number (e.g., k) original symbols into a number (e.g., N) of encoded symbols, where N is greater than k to introduce redundancy into a transmission, and increase the likelihood of successful decoding at the receiver. A receiver may receive and decode at least a number (e.g., M) of packets to recover the original packet, where M is less than N, but greater than k. In some examples, M may be fixed for all receiving devices.

However, in some wireless communications systems (e.g., new radio (NR) systems), different communication links (e.g., between a transmitting device and multiple receiving devices) may experience different channel conditions, resulting in different packet losses on the different communication links. If redundancy for all receiving devices is identical (e.g., inflexible), then some resources may be utilized inefficiently and some transmissions may be more likely to fail.

For example, a transmitting device (e.g., a base station or a UE) in communication with two receiving devices (e.g., base stations or UEs) may communicate via two respective communication links (e.g., a first link with a high path loss and a second link with a low path loss). If the transmitting device encodes and transmits signaling on both links using the same redundancy configuration (e.g., network coding with a same N value), then transmission on the first link may not be successfully received (e.g., because the redundancy configuration of the network encoding on the first link is not high enough to compensate for the high packet loss), while transmissions on the second link may unnecessarily utilize more resources than necessary (e.g., introducing more redundancy than necessary and utilizing extra resources that could be used for other communications). Thus, a fixed network coding redundancy configuration may result in inefficient use of available resources, failed transmissions, increased system latency, decreased reliability of communications, and decreased user experience.

A transmitting device (e.g., a UE or a base station) may support receiver-specific network coding redundancy techniques, as described herein. For example, a transmitting device may select a receiver-specific redundancy configuration (e.g., an amount of redundancy for a transmission of one or more packets) for transmission to a particular receiver based on a quality (e.g., a packet loss probability) of a link between the transmitting device and the receiving device. The transmitting device receive a packet loss probability report from the receiving device, indicating a quality of the link. The transmitting device may select or calculate a user-specific redundancy for the link based on the received packet loss probability report. In some examples, the transmitting device may receive an indication of a preferred redundancy configuration from the receiving device, and may select the preferred redundancy configuration as indicated. In some examples, the transmitting device may network encode and transmit one or more initial transmissions according to a default redundancy configuration, and may increment or decrement the default redundancy based on feedback from the receiving device.

Aspects of the disclosure are initially described in the context of wireless communications systems. Aspects of the disclosure are further illustrated by and described with reference to encoding processes, wireless communications systems, and process flows. Aspects of the disclosure are further illustrated by and described with reference to apparatus diagrams, system diagrams, and flowcharts that relate to techniques for receiver-specific network coding redundancy.

FIG. 1 illustrates an example of a wireless communications system 100 that supports techniques for receiver-specific network coding redundancy in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a transmitting device (e.g., a UE 115 or a base station 105, or the like) may support receiver-specific network coding redundancy techniques. For example, a transmitting device may select a receiver-specific redundancy configuration (e.g., an amount of redundancy for a transmission of one or more packets) for transmission to a particular receiver based on a quality (e.g., a path loss probability) of a link between the transmitting device and the receiving device. The transmitting device receive a packet loss probability report from the receiving device, indicating a quality of the link. The transmitting device may select or calculate a user-specific redundancy for the link based on the received packet loss probability report. In some examples, the transmitting device may receive an indication of a preferred redundancy configuration from the receiving device, and may select the preferred redundancy configuration as indicated. In some examples, the transmitting device may network encode and transmit one or more initial transmissions according to a default redundancy configuration, and may increment or decrement the default redundancy based on feedback from the receiving device.

Figure 2:
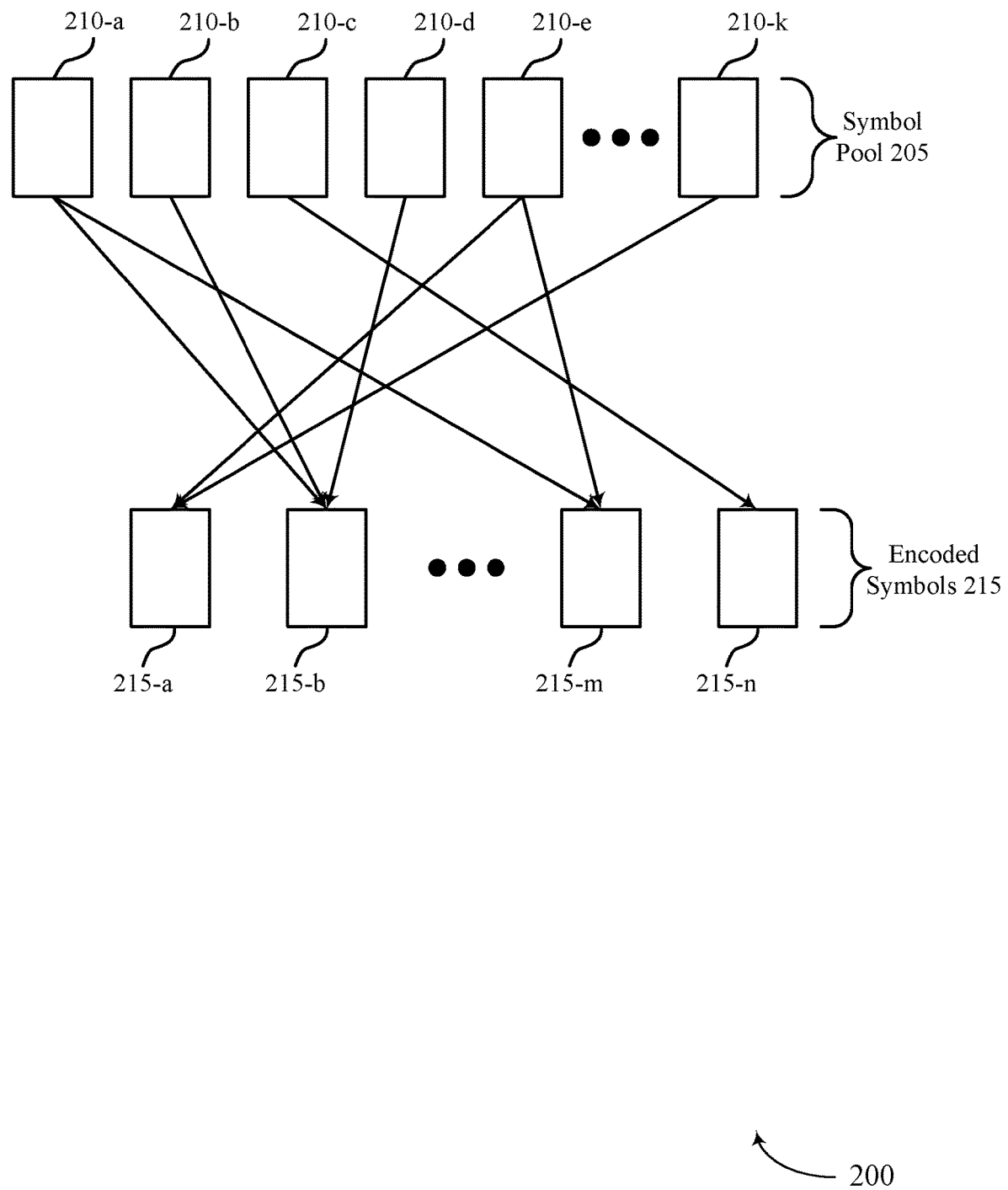
FIG. 2 illustrates an example of an encoding process that supports techniques for receiver-specific network coding redundancy in accordance with aspects of the present disclosure.

FIG. 2 illustrates an example of an encoding process 200 that supports techniques for receiver-specific network coding redundancy in accordance with aspects of the present disclosure. In some examples, encoding process 200 may implement aspects of or may be implemented by aspects of wireless communications system 100. For example, encoding process 200 may include a fountain code, such as a rateless code that can be used by a base station 105 and/or a UE 115 to encode a set of one or more packets. In particular, encoding process 200 may represent a Luby transform code, network encoding, or the like, that a transmitting device or encoder (e.g., a base station 105 or UE 115) uses when encoding a set of packets to transmit to a receiving device or decoder (e.g., a UE 115 or a base station 105).

The encoder may select a set of symbols from a symbol pool 205 to encode for transmitting to the decoder. For example, the symbol pool 205 may include k symbols 210, such as a first symbol 210-$a$, a second symbol 210-$b$, a third symbol 210-$c$, a fourth symbol 210-$d$, a fifth symbol 210-$e$, etc., to an k-th symbol 210-$n$. Each of the selected symbols 210 from the symbol pool 205 may then be encoded by the encoder (e.g., the transmitting device, such as a UE 115 or base station 105) to one or more encoded symbols 215, such as a first encoded symbol 215-$a$, a second encoded symbol 215-$b$, an m-th encoded symbol 215-$m$, and an n-th encoded symbol 215-$n$. The encoder may encode a number N encoded symbols 215, where N>k. In some cases, the encoding of the symbols 210 to the encoded symbols 215 may depend on a packet pool encoding function, f, on which the encoder is operating. For example, the packet pool encoding function, f, may include the encoder determining a degree, d, of each encoded symbol 215.

The degree may be chosen at random from a given node degree distribution, p(x). Subsequently, the encoder may choose 'd' distinct symbols 210 (e.g., information symbols) from the symbol pool 205 uniformly at random. These 'd' distinct symbols may be elements of the encoded symbol 215. For example, d=2 for the first encoding symbol 215-$a$ with the fifth symbol 210-$e$ and the n-th symbol 210-$n$ being the elements of the first encoding symbol 215-$a$, d=3 for the second encoding symbol 215-$b$ with the first symbol 210-$a$ and the second symbol 210-$b$ and the fourth symbol 210-$d$ being the elements of the second encoding symbol 215-$b$, d=2 for the m-th encoding symbol 215-$m$ with the first symbol 210-$a$ and fifth symbol 210-$e$ being the elements of the m-th encoding symbol 215-$m$, and d=1 for the n-th encoding symbol 215-$n$ with the third symbol 210-$c$ being the element of the n-th encoding symbol 215-$n$. The encoder may then assign an exclusive or (XOR) operation of the chosen 'd' symbols 210 (e.g., information symbols) to the encoding symbol 215.

In some cases, an ideal soliton distribution for the encoding process may include P1=1/k or Pi=1/i(i−1) for i=2, 3, . . . , k, with k representing the number of symbols 210 in the symbol pool 205. Additionally or alternatively, a robust soliton distribution for the encoding process may include Mi=(Pi+Ti)/B, for i=1, 2, . . . , k, where R/ik for i=1, . . . , k/R−1; Ti=R ln(R/δ)/k for i=k/R or Ti=0 for $$i = \frac{k}{R} + 1, \ldots, k;$$

R=c ln(k/δ)√k, where c is constant and δ is a decoding error probability; and B=sum(Pi+Ti) is a normalization factor.

Additionally, a decodability threshold value, M (e.g., a decodable threshold), may be defined for encoding process 200 (e.g., using Luby Transform encoding). As long as a number of network encoded packets or symbols received at a receiving device is greater than or equal to D, decoding of a message carried by the network encoded packets can be successful for the receiver. In some examples, if M=k, then the decoding success probability for the receiving device may be up to 99%. If M=k+1, then the decoding success probability for the receiving device may be up to 99.99%. If M=k+2, then the decoding success probability for the receiving device may be up to 99.9999%. Thus, in some examples, For a decodable set with M, k<M<N. The size of N may be increased to improve reliability, or decreased to lessen unnecessary redundancy. That is, increased redundancy by an encoder may result in improved reception at a receiving device. However, if redundancy is increased too much, the system may experience increased delays due to inefficient utilization of available resources.

In some examples, as described in greater detail with reference to FIG. 3, a transmitting device may communicate with multiple receiving devices via multiple communication links. In such examples, different communication links (e.g., between a transmitting device and multiple receiving devices) may experience different channel conditions, resulting in different packet losses on the different communication links. If redundancy for all receiving devices is identical (e.g., inflexible), then some resources may be utilized inefficiently, and some transmissions may be more likely to fail.

For example, a transmitting device (e.g., a base station 105 or a UE 115) in communication with two receiving devices (e.g., base stations 105 or UEs 115) may communicate via two respective communication links (e.g., a first link with a high path loss and a second link with a low path loss). If the transmitting device encodes and transmits signaling on both links using the same redundancy configuration (e.g., network coding with a same N value), then transmission on the first link may not be successfully received (e.g., because the redundancy configuration of the network encoding on the first link is not high enough to compensate for the high packet loss), while transmissions on the second link may unnecessarily utilize more resources than necessary (e.g., introducing more redundancy than necessary and utilizing extra resources that could be used for other communications). Thus, a fixed network coding redundancy configuration (e.g., a fixed N value) may result in inefficient use of available resources, failed transmissions, increased system latency, decreased reliability of communications, and decreased user experience.

As described in greater detail with reference to FIG. 3, a transmitting device (e.g., a UE 115 or a base station 105) may support receiver-specific network coding redundancy techniques, as described herein. For example, a transmitting device may select a receiver-specific redundancy configuration (e.g., an amount of redundancy for a transmission of one or more packets) for transmission to a particular receiver based on a quality (e.g., a packet loss probability) of a link between the transmitting device and the receiving device. As described herein, a redundancy configuration may be selected to provide a desired level of redundancy. For instance, for k original symbols, a number of network encoded symbols N may be adjusted to achieve a preferred redundancy. That is, a transmitting device may increase the number of network encoded symbols N to provide more redundancy (e.g., a first redundancy configuration R) or may reduce the number of network encoded symbols N to provide less redundancy (e.g., a second redundancy configuration R). Thus, a transmitting device may utilize a packet loss probability, as described herein, to control which redundancy configuration of multiple redundancy configurations are applied when performing network encoding.

The transmitting device receive a packet loss probability report from the receiving device, indicating a quality of the link. The transmitting device may select or calculate a user-specific redundancy for the link based on the received packet loss probability report. In some examples, the transmitting device may receive an indication of a preferred redundancy configuration from the receiving device, and may select the preferred redundancy configuration as indicated. In some examples, the transmitting device may network encode and transmit one or more initial transmissions according to a default redundancy configuration, and may increment or decrement the default redundancy based on feedback from the receiving device.

Figure 3:
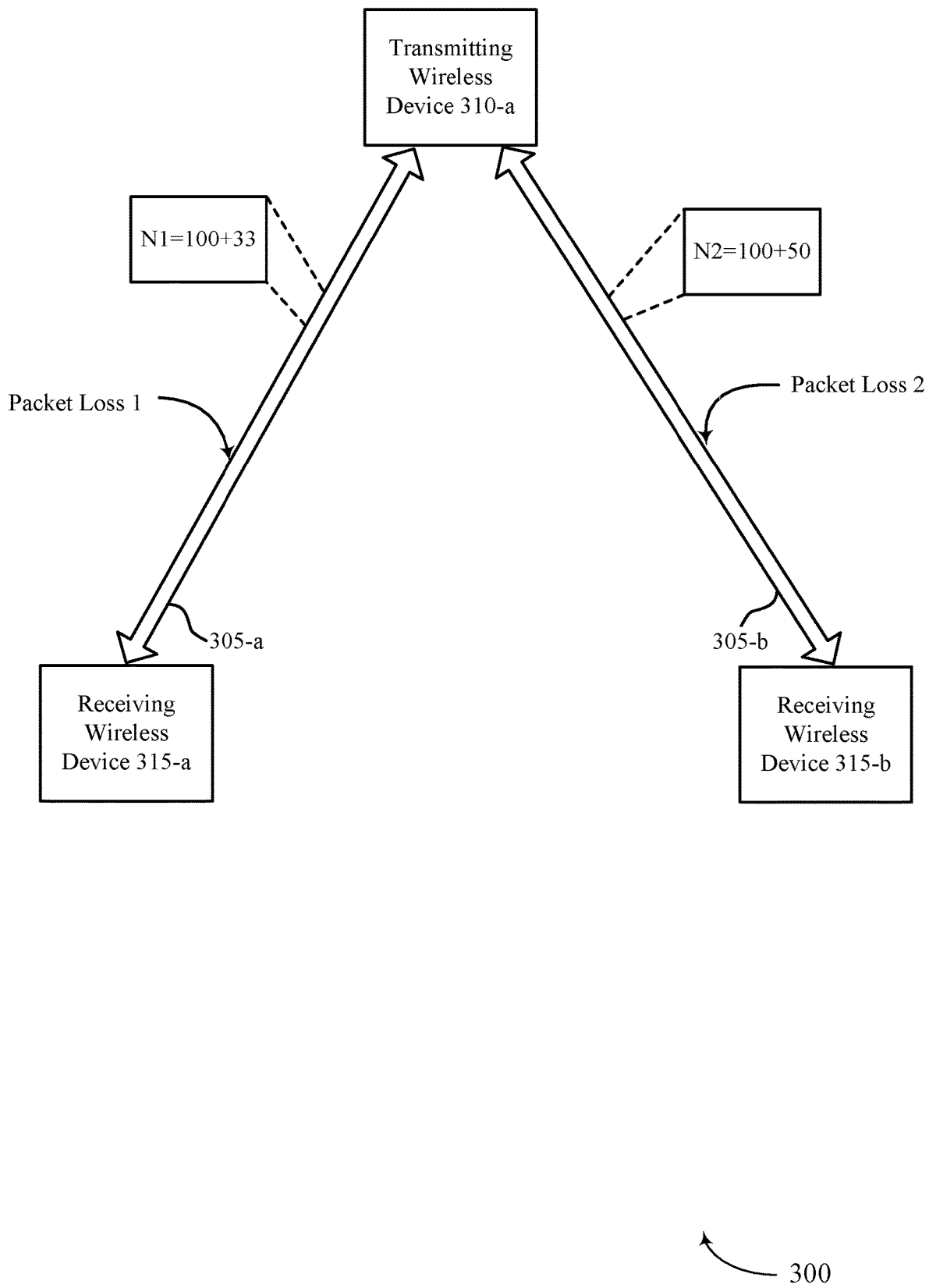
FIG. 3 illustrates an example of a wireless communications system that supports techniques for receiver-specific network coding redundancy in accordance with aspects of the present disclosure.

FIG. 3 illustrates an example of a wireless communications system 300 that supports techniques for receiver-specific network coding redundancy in accordance with aspects of the present disclosure. Wireless communications system 300 may implement aspects of or may be implemented by aspects of wireless communications system 100. For example, wireless device 310-a may be a transmitting wireless device communicating with one or more receiving wireless devices 315. Transmitting wireless device 310-a may be an example of any transmitting device, such as a base station 105, a UE 115, or the like. Transmitting wireless device 310-a may communicate with receiving wireless device 315-a via bidirectional communication link 305-a, and with receiving wireless device 315-b via bidirectional communication link 305-b. The bidirectional communication links may be Uu interfaces, PC5 interfaces, or the like.

The transmitting wireless device 310-a may encode and transmit control and data signaling to receiving wireless devices 315. In some examples, the transmitting wireless device 310-a may perform encoding (e.g., fountain coding, such as network encoding) on k original symbols (e.g., where k=100) as described in greater detail with reference to FIG. 2. In such examples, the transmitting wireless device 310-a may send N encoded packets to a receiving wireless device 315. Each receiving wireless device 315 may need M encoded packets (e.g., where M<N) to recover the original packets encoded by the transmitting wireless device 310-a. For a given performance requirement, in some examples, a decoding success probability M may be fixed (e.g., M=120).

As described herein, different communication links may experience different channel conditions, resulting in different packet losses. For instance, bidirectional communication link 305-a may experience packet loss probability 1 (e.g., 0.1), while bidirectional communication link 305-b may experience packet loss probability 2 (e.g., 0.2). To achieve a similar network encoding performance for all receiving wireless devices (e.g., receiving wireless device 315-a and receiving wireless device 315-b), the transmitting wireless device 310-*a* may construct receiver-specific redundancies for corresponding network coding transmissions, as described herein. For example, For k=100 and M=120, a packet loss probability 1 (e.g., 10%) means that about 12 packets of the 120 packets may be lost. Thus, the transmitting wireless device 310-*a* may select a redundancy configuration resulting in N=133 for transmissions to receiving wireless device 315-*a* (e.g., 100 original symbols plus 20 to satisfy M=120 plus 13 to address packet loss probability 1 for bidirectional communication link 305-*a*). Thus, even with path loss 1=0.1, if ten percent of the 120 encoded symbols decoded by the receiving wireless device 315 are lost, the added redundancy of 13 encoded symbols may result in successful reception of the original one or more encoded packets by the receiving wireless device 315-*a*. Similarly, the transmitting wireless device 310-*a* may select a redundancy configuration resulting in N=150 for transmissions to receiving wireless device 315-*b* (e.g., 100 original symbols plus 20 to satisfy M=120 plus 30 to address packet loss probability 2 for bidirectional communication link 305-*b*).

By performing receiver-specific redundancy encoding for different receiving wireless devices 315, the transmitting wireless device 310 may increase the likelihood of successful decoding by receiving wireless devices 315, and may reduce signaling overhead and decrease system latency by adding redundancy without unnecessarily utilize available system resources. Thus, techniques described herein may result in decreased system latency, decreased signaling overhead, improved reception of network encoded transmissions, improved reliability of communications, and improved user experience.

A transmitting wireless device 310 may select a receiver-specific redundancy configuration for encoding one or more packets based on a quality of a communication link with the receiving wireless device 315, as described in greater detail with reference to FIGS. 4 and 5. For example, a wireless device may estimate a packet loss probability for the link. For instance, receiving wireless device 315-*a* may calculate, or otherwise determine, a packet loss probability (e.g., $P_{loss}$) as a packet delivery rate over a certain period of time (e.g., T). The receiving wireless device 315 may estimate a packet loss probability as a number of received packets divided by a total number of packets transmitted during time $$T(P_{loss}) = \frac{\text{Number of Received Packets}}{\text{Total number of Transmitted Packets}}.$$

A redundancy for the transmission may then be calculated as redundancy $$R = \frac{M}{1 - P_{loss}} - k.$$

In some examples, the receiving wireless device 315 may transmit a packet loss probability report (e.g., including an indication of $P_{loss}$) to the transmitting wireless device 310-*a*, and the transmitting wireless device 310-*a* may select (e.g., calculate) a redundancy configuration (e.g., a value for R). In some examples, the receiving wireless device 315-*a* may calculate the redundancy configuration (e.g., value for R), and may transmit an indication of a requested redundancy configuration to the transmitting wireless device 310-*a*. In some examples, the redundancy may be calculated through a lookup table (LUT), which may map a given packet loss probability $P_{loss}$ to a redundancy value R. In such examples, the receiving wireless device 315 may transmit an indication of a calculated $P_{loss}$ and the transmitting wireless device 310-*a* may map the indicated $P_{loss}$ to a corresponding R via the LUT. Or, the receiving wireless device 315 may map the calculated $P_{loss}$ to the corresponding R and transmit an indication (e.g., an index corresponding to the LUT) of the corresponding R to the transmitting wireless device 310.

In some examples, the transmitting wireless device 310 may determine a receiver-specific redundancy configuration based on feedback received from the receiving wireless device 315. For example, the transmitting wireless device 310 may network encode and transmit one or more packets to the receiving wireless device 310 using a default redundancy (e.g., $R_0$). The receiving wireless device 315 may transmit feedback information associated with the network encoded one or more packets (e.g., an acknowledgement (ACK) message, or a negative acknowledgement (ACK) message). If the feedback information indicates that the receiving wireless device 315 successful recovers an original one or more packets network encoded according to $R_0$, then the transmitting wireless device 310 may continue to use $R_0$ for future network encoding and transmitting to that receiving wireless device 315. In some examples, if the feedback information indicates that the receiving wireless device 315 successfully recovers an original one or more packets network encoded according to $R_0$, then the transmitting wireless device 310-*a* may decrease $R_0$ by a step size (e.g., D) and network and encode a next one or more packets using redundancy $R_0 - D$. The transmitting wireless device 310-*a* may continue to decrease the redundancy by step size D until the receiving wireless device 315 transmits feedback information (e.g., a NACK) indicating that it did not successfully recover the one or more network encoded packets. In such examples, upon receiving the feedback information, the transmitting wireless device 310-*a* may revert to a most recent (e.g., successful) redundancy configuration (e.g., the last redundancy configuration for which the receiving wireless device transmitted an ACK).

In some examples, if the transmitting wireless device 310-*a* network encodes an initial one or more packets using the default redundancy $R_0$ and receives feedback information indicating that the receiving wireless device 315 did not successfully recover the one or more network encoded packets, then the transmitting wireless device 310-*a* may increase $R_0$ by a step size A. The transmitting wireless device 310-*a* may then increment the redundancy configuration, and may network encode a next one or more packets using redundancy $R_0 + A$. The transmitting wireless device 310-*a* may continue to increment the redundancy configuration until it receives feedback information (e.g., an ACK) indicating that the receiving wireless device 315 successfully recovered the network encoded and transmitted one or more packets. In some examples, the transmitting wireless device 310-*a* may apply a redundancy cap (e.g., C) for network encoding transmission. The transmitting wireless device 310-*a* may be constrained (e.g., by configuration, by one or more rules, or the like) not to increment the redundancy configuration to exceed C.

In some examples, the transmitting wireless device 310-*a* may be a base station network encoding and sending downlink transmissions, as described in greater detail with reference to FIG. 4. In some examples, the transmitting wireless device 310-*a* may be a UE network encoding and sending uplink transmissions, as described in greater detail with reference to FIG. 4.

Figure 4:
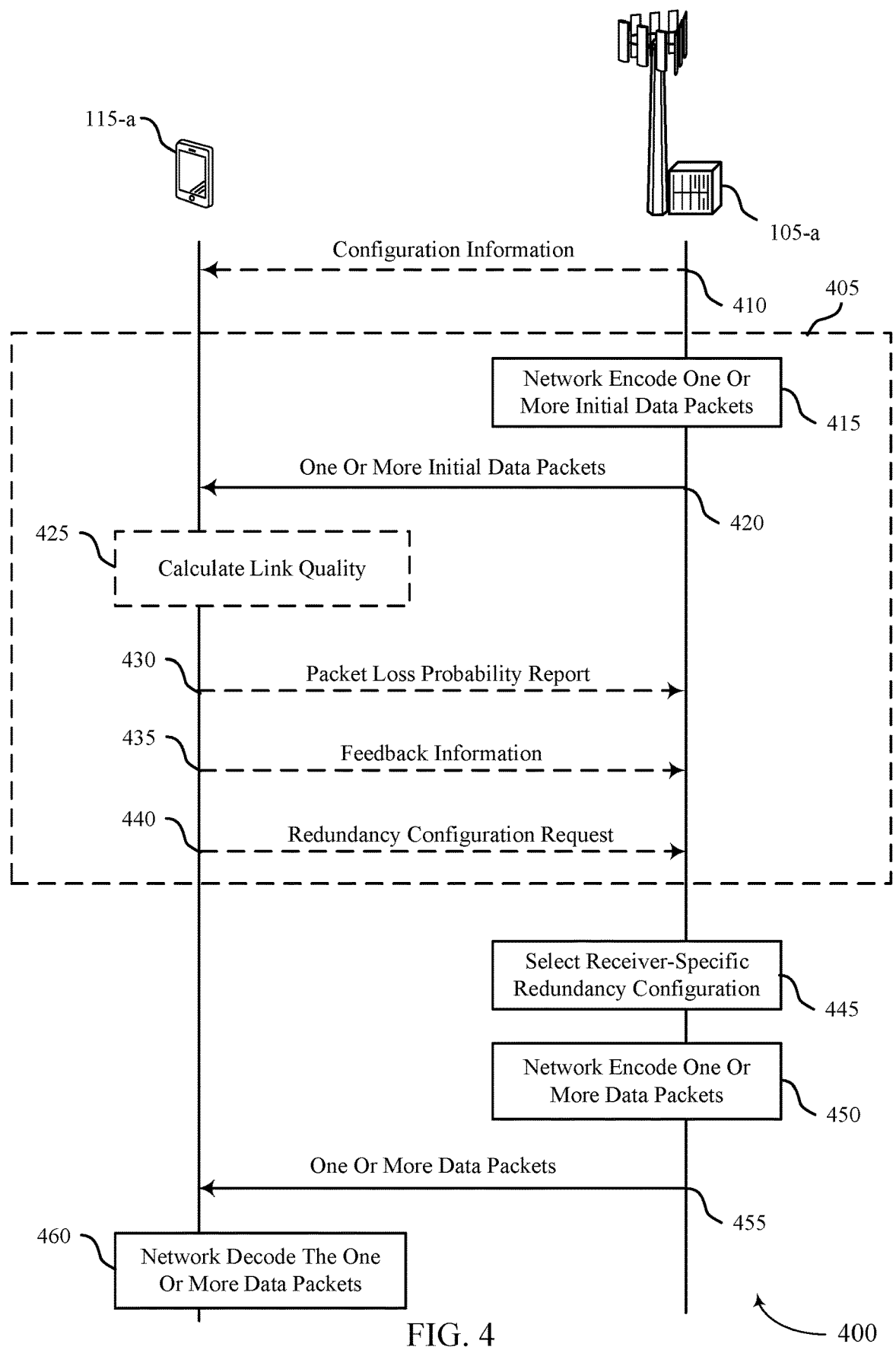
FIG. 4 illustrates an example of a process flow that supports techniques for receiver-specific network coding redundancy in accordance with aspects of the present disclosure.

FIG. 4 illustrates an example of a process flow 400 that supports techniques for receiver-specific network coding redundancy in accordance with aspects of the present disclosure. Process flow 400 may implement aspects of or may be implemented by aspects of wireless communications system 100 and wireless communications system 300. For example, base station 105-a may be an example of a base station 105 or a transmitting wireless device 310 as described with reference to FIGS. 2 and 3. UE 115-a may be an example of a UE 115 or a receiving wireless device 315 as described with reference to FIGS. 2 and 3.

In some examples, base station 105-a may perform receiver-specific network encoding, as described herein. For example, at 405, the base station 105-a, the UE 115-a, or both, may determine a quality level of a link between the base station 105-a and the UE 115-a. The quality level of the link may be determined based at least in part on one or more messages communicated over the link (e.g., at 405). At 445, based at least in part on the link quality (e.g., which may be determined or calculated by the UE 115-a and indicated to the base station 105-a, or determined by the base station 105-a, or inferred by the base station 105-a based at least in part on the one or more messages communicated over the link), the base station 105-a may select a first receiver-specific redundancy configuration (e.g., from a set of multiple possible redundancy configurations). In some examples, selecting a redundancy configuration may include selecting a value for N or a value for R, as described with reference to FIGS. 2 and 3. At 450, the base station 105-a may network encode one or more data packets for transmission to the UE 115-a according to the selected receiver-specific redundancy configuration. For example, as described in greater detail with reference to FIG. 2, the base station 105-a may map one or more data packets across k symbols, and may encode the k symbols using a packet pool encoding function, f and a degree, d, of each encoded symbol. Thus, the one or more data packets may be encoded across the N encoded symbols according to the selected redundancy configuration.

At 455, the base station 105-a may transmit the network encoded one or more data packets to the UE 115-a via the link. The UE 115-a may receive the one or more data packets at 455, and at 460 may network decode the one or more data packets. In some examples, the UE 115-a may decode M symbols, as described in greater detail with reference to FIGS. 2 and 3. The UE 115-a may successfully receive and decode the one or more data packets based on the receiver-specific redundancy configuration selected at 445 being sufficient to mitigate a packet loss on the link.

In some examples, the base station 105-a may select the receiver-specific redundancy configuration at 445 based on an estimated packet loss rate for the link. For instance, at 410, the base station 105-a may configure the UE 115-a with one or more parameters for estimation packet loss probabilities on the link between the base station 105-a and the UE 115-a. The parameters may include, for example, a packet loss measurement window (e.g., time period 7), or the like. At 420, the base station 105-a may transmit one or more initial data packets to the UE 115-a. The data packets may be network encoded (e.g., according to an initial or default redundancy configuration). At 425, the UE 115-a may calculate a link quality based on the received one or more initial data packets. For instance, the UE 115-a may determine a data packet loss probability (e.g., $P_{loss}$ as described with reference to FIG. 3) during the packet loss measurement window indicated in the configuration information. In such examples, the UE 115-a may transmit, at 430, a packet loss probability report. In some examples, the packet loss probability report may include an indication of the calculated link quality (e.g., the packet loss probability value). In some examples, the packet loss probability report may include an index value associated with a LUT that defines a relationship between packet loss probability values and redundancy configurations. Upon receiving the packet loss probability report, the base station 105-a may select the receiver-specific redundancy configuration at 445 based on the link quality calculated by the UE 115-a at 425. For example, the base station 105-a may calculate the redundancy for the link based on the indicated packet loss probability, or may map the indicated packet loss probability to a corresponding redundancy (e.g., via a LUT).

In some examples, the base station 105-a may select the receiver-specific redundancy configuration at 445 based on an feedback information received from the UE 115-a. For instance, at 415, the base station 105-a may network encode one or more initial data packets using a default redundancy configuration (e.g., $R_0$). At 420, the base station 105-a may transmit the one or more initial data packets to the UE 115-a. The UE 115-a may transmit feedback information associated with the one or more initial data packets at 435. In some case, the UE 115-a may transmit feedback information indicating that the UE 115-a successfully recovered the one or more initial data packets (e.g., an ACK). In such examples, the base station 105-a may select the receiver-specific redundancy configuration by using the default redundancy configuration. In some cases, where the feedback information indicates that the UE 115-a successfully recovered the one or more initial data packets, the base station 105-a may decrement the default redundancy configuration by an offset value (e.g., D). In such examples, the base station 105-a may iteratively network encode and transmit data packets, and may continue to decrement the previously used redundancy configuration by the offset value until the UE 115-a transmits a NACK (e.g., at which point the base station 105-a may select a most recently utilized redundancy configuration that resulted in an ACK for future network encoding and transmitting). In some cases, the feedback information may indicate that the UE 115-a did not successfully recover the one or more initial data packets (e.g., a NACK). In such cases, the base station 105-a may increment the default redundancy configuration by an offset value (e.g., A), and may select the receiver-specific redundancy configuration by using the default redundancy configuration plus the offset value. The base station 105-a may iteratively network encode and transmit data packets, and may continue to increment the previously used redundancy configuration by the offset value until the UE 115-a transmits an ACK. In some examples, the base station 105-a may refrain from incrementing a previously used redundancy configuration if the incrementing would satisfy (e.g., exceed) a threshold (e.g., a cap redundancy configuration C).

In some examples, the UE 115-a may request a specific redundancy for downlink transmissions. For instance, the base station 105-a may transmit the one or more initial data packets at 420. The UE 115-a may calculate the link quality at 425, as described herein. The UE 115-a may select a preferred redundancy configuration, and may transmit a redundancy configuration request indicating the preferred redundancy configuration at 440. In some examples, the UE 115-a may select the preferred redundancy configuration based on a LUT defining a relationship between a calculated packet loss probability and the preferred redundancy configuration. In such examples, the redundancy configuration request may include an index to the LUT identifying the preferred redundancy configuration. At 445, the base station 105-*a* may select the receiver-specific redundancy configuration by selecting the preferred redundancy configuration indicated at 440. The redundancy configuration request may be included in a media access control (MAC) control element (CE) message, an uplink control information (UCI) message, or the like.

In some examples, the base station 105-*a* may activate or deactivate UE-specific network encoding transmission procedures. For example, the base station may transmit (e.g., at 105) a downlink message deactivating UE-specific network encoding transmission procedures. In such example, the UE 115-*a* may refrain from transmitting a redundancy configuration request message at 440. In some examples, the base station 105-*a* may activate or deactivate UE-specific network encoding transmission procedures based at least in part on one or more conditions being satisfied. For example, the base station 105-*a* may determine available downlink resources, available uplink resources, or both, a quality of service (QoS) requirement of transmitting traffic, a processing capability of the UE 115-*a* or the base station 105-*a* or both, or any combination thereof. Based on any combination of such determinations, the base station 105-*a* may determine whether to activate or deactivate UE-specific redundancy configurations.

In some examples, as described herein with reference to FIG. 4, the base station 105-*a* may configure one or more parameters (e.g., for estimating packet loss probabilities at 425, for transmitting redundancy configuration requests at 440, or the like). In some examples, the base station 105-*a* may configure the UE 115-*a* with multiple parameters (e.g., multiple sets of parameter values for each parameter, multiple subsets of parameters, or the like). The parameters may include, but are not limited to, a packet loss probability estimation period T, a redundancy LUT, an initial or default redundancy configuration, a redundancy increase step size, a redundancy decrease step size, a redundancy cap C, or any combination thereof. In such examples, the base station 105-*a* nay configure the UE 115-*a* with the multiple parameters via RRC signaling. The base station 105-*a* may indicate (e.g., activate) one or more of the multiple permeameters via DCI signaling. For instance, the base station 105-*a* may switch parameter choices or options via DCI signaling if multiple sets of parameters are configured via RRC signaling.

Figure 5:
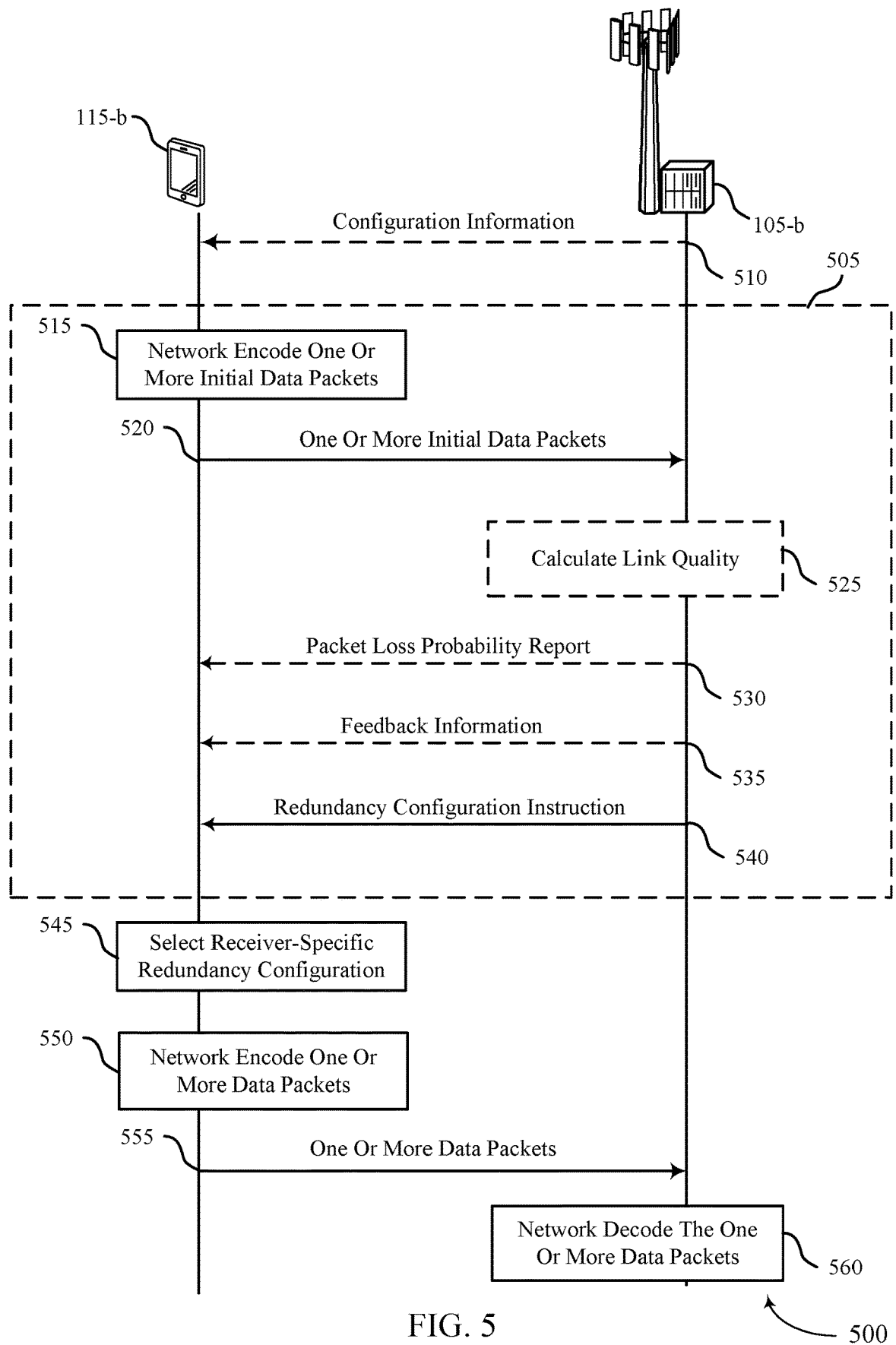
FIG. 5 illustrates an example of a process flow that supports techniques for receiver-specific network coding redundancy in accordance with aspects of the present disclosure.

FIG. 5 illustrates an example of a process flow 500 that supports techniques for receiver-specific network coding redundancy in accordance with aspects of the present disclosure. Process flow 500 may implement aspects of or may be implemented by aspects of wireless communications system 100, wireless communications system 300, and process flow 400. For example, base station 105-*b* may be an example of a base station 105 or a transmitting wireless device 310 as described with reference to FIGS. 2 and 3. UE 115-*b* may be an example of a UE 115 or a receiving device 215 as described with reference to FIGS. 2 and 3.

In some examples, the UE 115-*b* may perform receiver-specific network encoding, as described herein. For example, at 505, the base station 105-*b*, the UE 115-*b*, or both, may determine a quality level of a link between the base station 105-*b* and the UE 115-*b*. The quality level of the link may be determined based at least in part on one or more messages communicated over the link (e.g., at 505). At 545, based at least in part on the link quality (e.g., which may be determined or calculated by the base station 105-*b* and indicated to the UE 115-*b*, or determined by the UE 115-*b*, or inferred by the UE 115-*b* based at least in part on the one or more messages communicated over the link), the UE 115-*b* may select a first receiver-specific redundancy configuration (e.g., from a set of multiple possible redundancy configurations). In some examples, selecting a redundancy configuration may include selecting a value for N or a value for R, as described with reference to FIGS. 2 and 3. At 550, the UE 115-*b* may network encode one or more data packets for transmission to the base station 105-*b* according to the selected receiver-specific redundancy configuration. At 555, the UE 115-*b* may transmit the network encoded one or more data packets to the base station 105-*b* via the link. The base station 105-*b* may receive the one or more data packets at 555, and at 560 may network decode the one or more data packets. In some examples, the base station 105-*b* may decode M symbols, as described in greater detail with reference to FIGS. 2 and 3. The base station 105-*b* may successfully receive and decode the one or more data packets based on the receiver-specific redundancy configuration selected at 545 being sufficient to mitigate a packet loss on the link.

In some examples, the UE 115-*b* may select the receiver-specific redundancy configuration at 545 based on an estimated packet loss rate for the link. For instance, at 520, the UE 115-*b* may transmit one or more initial data packets to the base station 105-*b*. The data packets may be network encoded (e.g., according to an initial or default redundancy configuration). At 525, the base station 105-*b* may calculate a link quality based on the received one or more initial data packets. For instance, the base station 105-*b* may determine a data packet loss probability (e.g., $P_{loss}$ as described with reference to FIG. 3) during a packet loss measurement window. In such examples, the base station 105-*b* may transmit, at 530, a packet loss probability report. In some examples, the packet loss probability report may include an indication of the calculated link quality (e.g., the packet loss probability value). In some examples, the packet loss probability report may include an index value associated with a LUT that defines a relationship between packet loss probability values and redundancy configurations. Upon receiving the packet loss probability report, the UE 115-*b* may select the receiver-specific redundancy configuration at 545 based on the link quality calculated by the base station 105-*b* at 525. For example, the UE 115-*b* may calculate the redundancy for the link based on the indicated packet loss probability, or may map the indicated packet loss probability to a corresponding redundancy (e.g., via a LUT). In some examples, at 510, the base station 105-*b* may configure the UE 115-*b* with one or more parameters, which may include the LUT.

In some examples, the UE 115-*b* may select the receiver-specific redundancy configuration at 545 based on an feedback information received from the base station 105-*b*. For instance, at 515, the UE 115-*b* may network encode one or more initial data packets using a default redundancy configuration (e.g., $R_0$). At 520, the UE 115-*b* may transmit the one or more initial data packets to the base station 105-*b*. The base station 105-*b* may transmit feedback information associated with the one or more initial data packets at 535. In some case, the base station 105-*b* may transmit feedback information indicating that the base station 105-*b* successfully recovered the one or more initial data packets (e.g., an ACK). In such examples, the UE 115-*b* may select the receiver-specific redundancy configuration by using the default redundancy configuration. In some cases, where the feedback information indicates that the base station 105-*b* successfully recovered the one or more initial data packets, the UE 115-b may decrement the default redundancy configuration by an offset value (e.g., D). In such examples, the UE 115-b may iteratively network encode and transmit data packets, and may continue to decrement the previously used redundancy configuration by the offset value until the base station 105-b transmits a NACK (e.g., at which point the UE 115-b may select a most recently utilized redundancy configuration that resulted in an ACK for future network encoding and transmitting).

In some cases, the feedback information received by the UE 115-b at 535 may indicate that the base station 105-b did not successfully recover the one or more initial data packets (e.g., a NACK). In such cases, the UE 115-b may increment the default redundancy configuration by an offset value (e.g., A), and may select the receiver-specific redundancy configuration by using the default redundancy configuration plus the offset value. The UE 115-b may iteratively network encode and transmit data packets, and may continue to increment the previously used redundancy configuration by the offset value until the base station 105-b transmits an ACK. In some examples, the UE 115-b may refrain from incrementing a previously used redundancy configuration if the incrementing would satisfy (e.g., exceed) a threshold (e.g., a cap redundancy configuration C).

In some examples, the base station 105-b may configure the UE 115-b with one or more parameters for selecting the receiver-specific redundancy configuration based on feedback information. For instance, at 510, the base station 105-b may transmit configuration information including the one or more parameters. The one or more parameters may include the default redundancy configuration, the offset value A, the offset value D (e.g., which may be the same value or a different value from offset value A), the redundancy configuration C, or any combination thereof.

In some examples, the base station 105-b may instruct the UE 115-b about a specific redundancy to use for uplink transmissions. For instance, the UE 115-b may transmit the one or more initial data packets at 520. The base station 105-b may calculate the link quality at 525, as described herein. The base station 105-b may select a preferred redundancy configuration, based on the calculated link quality, and may transmit a redundancy configuration instruction indicating the preferred redundancy configuration at 540. In some examples, the base station 105-b may select the preferred redundancy configuration based on a LUT defining a relationship between a calculated packet loss probability and the preferred redundancy configuration. In such examples, the redundancy configuration instruction may include an index to the LUT identifying the preferred redundancy configuration. At 545, the UE 115-b may select the receiver-specific redundancy configuration by selecting the preferred redundancy configuration indicated at 540. The redundancy configuration request may be included in a MAC-CE message, an downlink control information (DCI) message, or the like.

In some examples, the base station 105-b may activate or deactivate UE-specific network encoding transmission procedures. For example, the base station may transmit (e.g., at 505) a downlink message deactivating UE-specific network encoding transmission procedures. In such example, the UE 115-b may refrain from selecting receiver-specific redundancy configurations (e.g., may utilize a default redundancy configuration or network defined or fixed redundancy configuration). In some examples, the base station 105-b may activate or deactivate UE-specific network encoding transmission procedures based at least in part on one or more conditions being satisfied. For example, the base station 105-b may determine available downlink resources, available uplink resources, or both, a quality of service (QoS) requirement of transmitting traffic, a processing capability of the UE 115-b or the base station 105-b or both, or any combination thereof. Based on any combination of such determinations, the base station 105-b may determine whether to activate or deactivate UE-specific redundancy configurations.

In some examples, as described herein with reference to FIG. 5, the base station 105-b may configure one or more parameters (e.g., for estimating packet loss probabilities at 525, for transmitting receiving or interpreting redundancy configuration instructions at 540, for utilizing and incrementing or decrementing a default redundancy configuration at 545 based on feedback information received at 535, or the like). The parameters may include, but are not limited to, a packet loss probability estimation period T, a redundancy LUT, an initial or default redundancy configuration, a redundancy increase step size, a redundancy decrease step size, a redundancy cap C, or any combination thereof. In some examples, the base station 105-b may configure the UE 115-b with multiple parameters (e.g., multiple sets of parameter values for each parameter, multiple subsets of parameters, or the like). In such examples, the base station 105-b nay configure the UE 115-b with the multiple parameters via RRC signaling. The base station 105-b may indicate (e.g., activate) one or more of the multiple permeameters via DCI signaling. For instance, the base station 105-b may switch parameter choices or options via DCI signaling if multiple sets of parameters are configured via RRC signaling.

Figure 6:
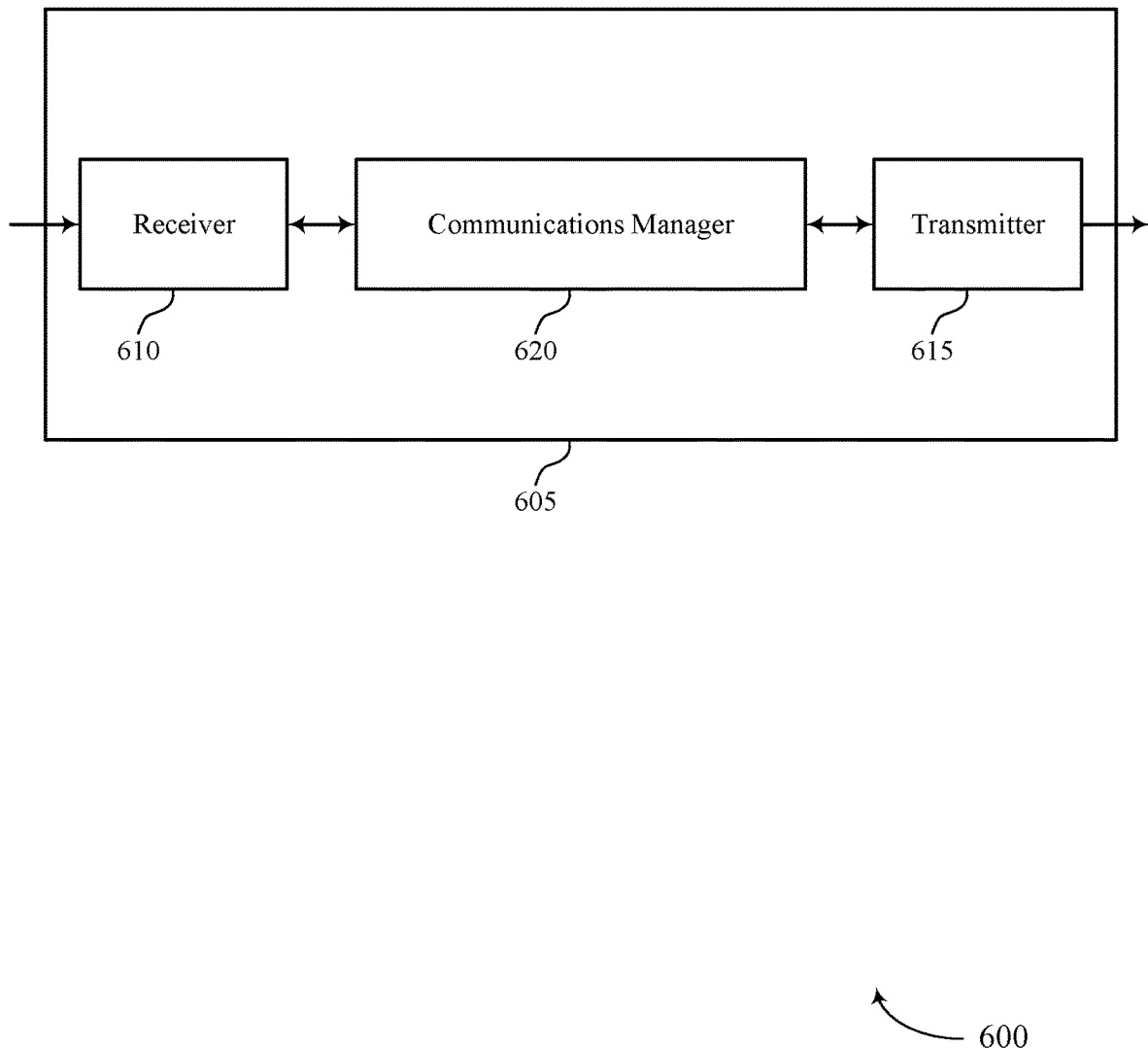
FIGS. 6 and 7 show block diagrams of devices that support techniques for receiver-specific network coding redundancy in accordance with aspects of the present disclosure.

FIG. 6 shows a block diagram 600 of a device 605 that supports techniques for receiver-specific network coding redundancy in accordance with aspects of the present disclosure. The device 605 may be an example of aspects of a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for receiver-specific network coding redundancy). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for receiver-specific network coding redundancy). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for receiver-specific network coding redundancy as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a transmitting device in accordance with examples as disclosed herein. For example, the communications manager 620 may be configured as or otherwise support a means for determining a quality level of a link between the transmitting device and a receiving device based on one or more messages communicated over the link. The communications manager 620 may be configured as or otherwise support a means for selecting a first receiver-specific redundancy configuration of a set of multiple redundancy configurations based on the quality level. The communications manager 620 may be configured as or otherwise support a means for network encoding one or more data packets for transmission to the receiving device according to the first receiver-specific redundancy configuration. The communications manager 620 may be configured as or otherwise support a means for transmitting, to the receiving device, the one or more data packets based on the network encoding.

Additionally, or alternatively, the communications manager 620 may support wireless communications at a receiving device in accordance with examples as disclosed herein. For example, the communications manager 620 may be configured as or otherwise support a means for determining a quality level of a link between a transmitting device and the receiving device based on one or more messages communicated over the link. The communications manager 620 may be configured as or otherwise support a means for receiving, from the transmitting device via the link, one or more data packets that are network encoded according to a first receiver-specific redundancy configuration of a set of multiple redundancy configurations corresponding to the quality level. The communications manager 620 may be configured as or otherwise support a means for network decoding the one or more data packets based on the first receiver-specific redundancy configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for user-specific network encoding, resulting in more efficient use of computational resources, decreased signaling overhead, decreased latency, and improved user experience.

Figure 7:
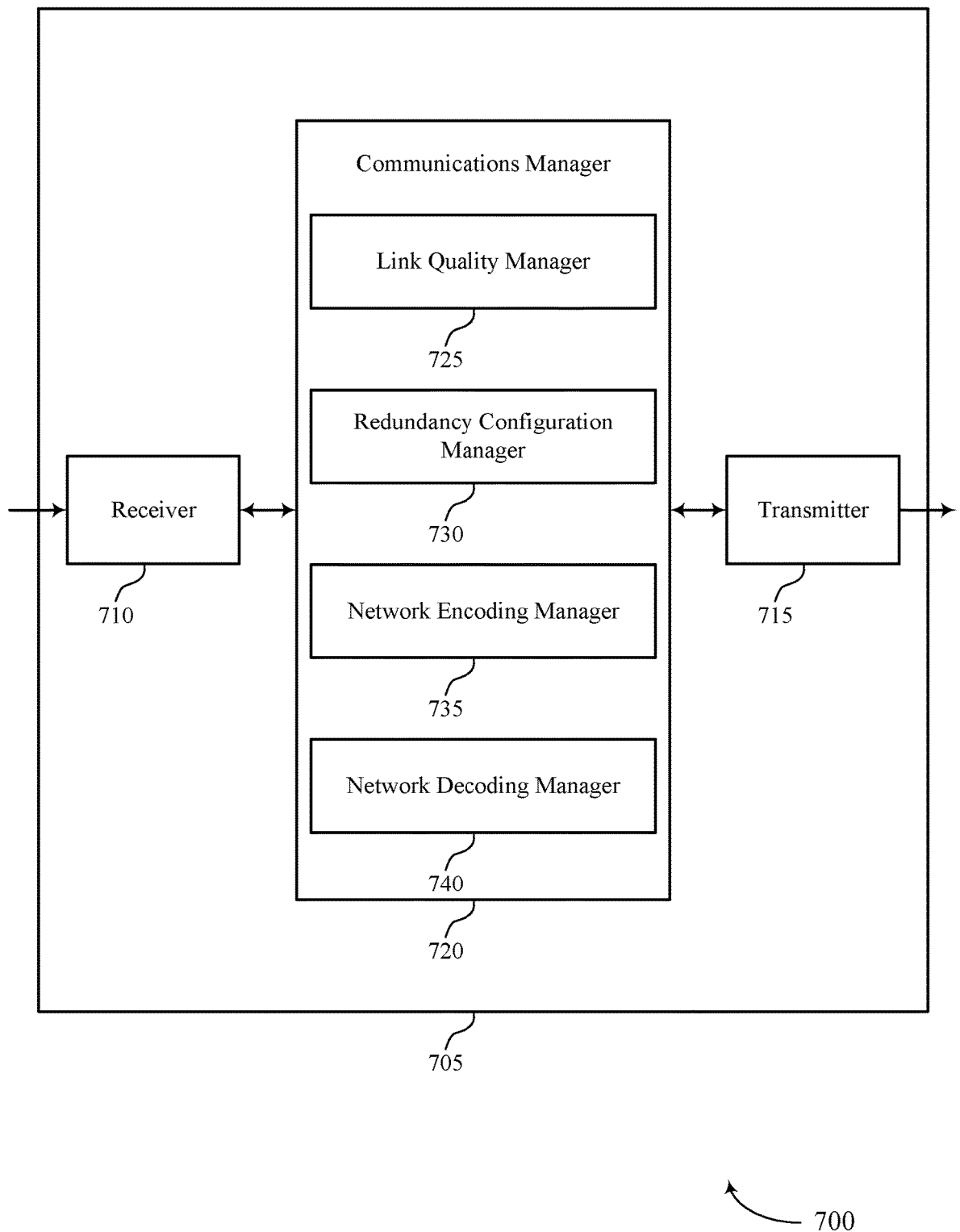

FIG. 7 shows a block diagram 700 of a device 705 that supports techniques for receiver-specific network coding redundancy in accordance with aspects of the present disclosure. The device 705 may be an example of aspects of a device 605, a UE 115, or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for receiver-specific network coding redundancy). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for receiver-specific network coding redundancy). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for receiver-specific network coding redundancy as described herein. For example, the communications manager 720 may include a link quality manager 725, a redundancy configuration manager 730, a network encoding manager 735, a network decoding manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a transmitting device in accordance with examples as disclosed herein. The link quality manager 725 may be configured as or otherwise support a means for determining a quality level of a link between the transmitting device and a receiving device based on one or more messages communicated over the link. The redundancy configuration manager 730 may be configured as or otherwise support a means for selecting a first receiver-specific redundancy configuration of a set of multiple redundancy configurations based on the quality level. The network encoding manager 735 may be configured as or otherwise support a means for network encoding one or more data packets for transmission to the receiving device according to the first receiver-specific redundancy configuration. The network encoding manager 735 may be configured as or otherwise support a means for transmitting, to the receiving device, the one or more data packets based on the network encoding.

Additionally, or alternatively, the communications manager 720 may support wireless communications at a receiving device in accordance with examples as disclosed herein. The link quality manager 725 may be configured as or otherwise support a means for determining a quality level of a link between a transmitting device and the receiving device based on one or more messages communicated over the link. The redundancy configuration manager 730 may be configured as or otherwise support a means for receiving, from the transmitting device via the link, one or more data packets that are network encoded according to a first receiver-specific redundancy configuration of a set of multiple redundancy configurations corresponding to the quality level. The network decoding manager 740 may be configured as or otherwise support a means for network decoding the one or more data packets based on the first receiver-specific redundancy configuration.

Figure 8:
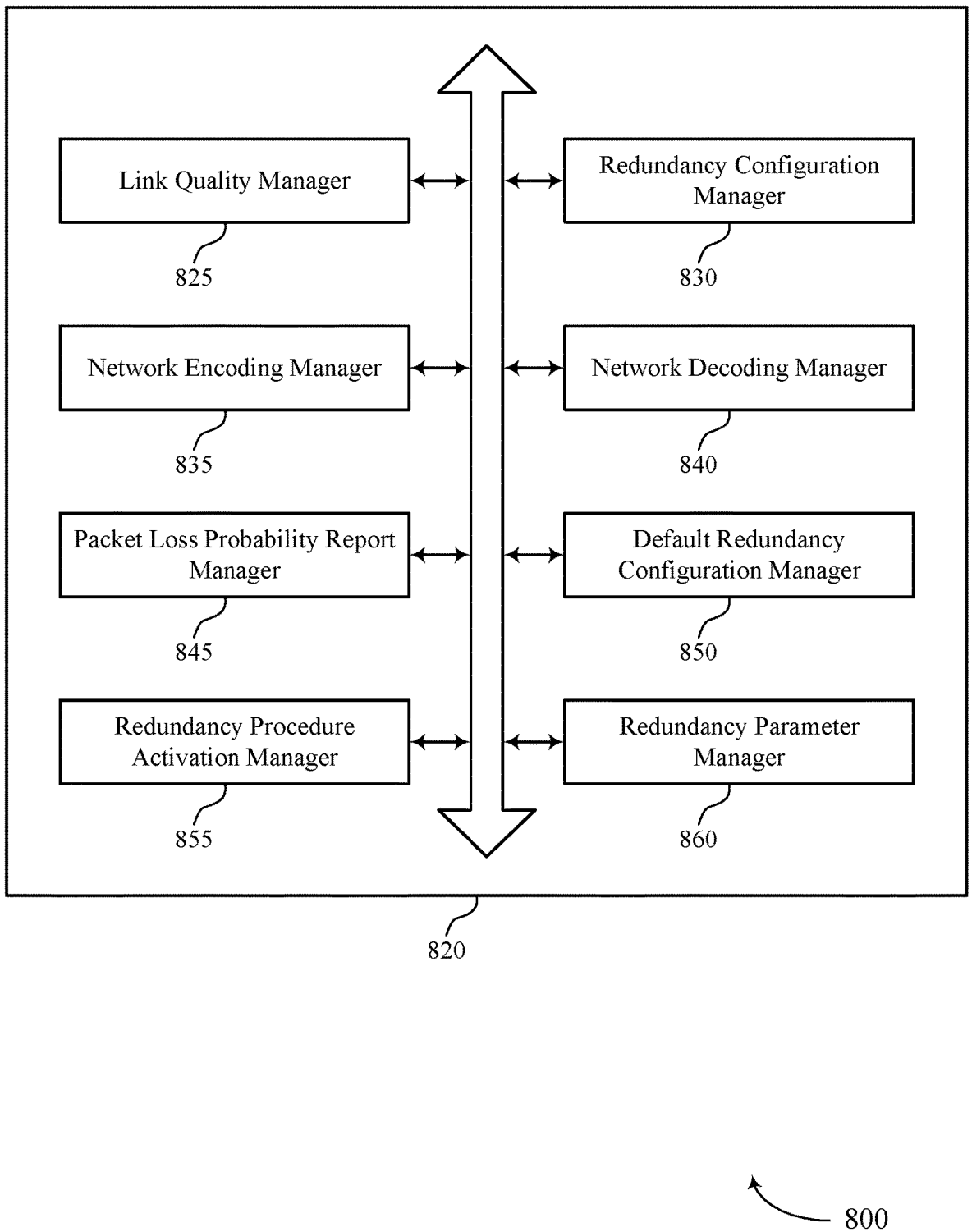
FIG. 8 shows a block diagram of a communications manager that supports techniques for receiver-specific network coding redundancy in accordance with aspects of the present disclosure.

FIG. 8 shows a block diagram 800 of a communications manager 820 that supports techniques for receiver-specific network coding redundancy in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for receiver-specific network coding redundancy as described herein. For example, the communications manager 820 may include a link quality manager 825, a redundancy configuration manager 830, a network encoding manager 835, a network decoding manager 840, a packet loss probability report manager 845, a default redundancy configuration manager 850, a redundancy procedure activation manager 855, a redundancy parameter manager 860, or any combination thereof. Each of these components may communicate, directly or indirectly, with one another (e.g., via one or more buses).

The communications manager 820 may support wireless communications at a transmitting device in accordance with examples as disclosed herein. The link quality manager 825 may be configured as or otherwise support a means for determining a quality level of a link between the transmitting device and a receiving device based on one or more messages communicated over the link. The redundancy configuration manager 830 may be configured as or otherwise support a means for selecting a first receiver-specific redundancy configuration of a set of multiple redundancy configurations based on the quality level. The network encoding manager 835 may be configured as or otherwise support a means for network encoding one or more data packets for transmission to the receiving device according to the first receiver-specific redundancy configuration. In some examples, the network encoding manager 835 may be configured as or otherwise support a means for transmitting, to the receiving device, the one or more data packets based on the network encoding.

In some examples, the packet loss probability report manager 845 may be configured as or otherwise support a means for receiving, from the receiving device, a packet loss probability report based on transmitting the one or more messages to the receiving device, where the one or more messages include one or more downlink data packets transmitted during a packet loss measurement window.

In some examples, the default redundancy configuration manager 850 may be configured as or otherwise support a means for network encoding a second one or more data packets for transmission to the receiving device according to a default redundancy configuration of the set of multiple redundancy configurations. In some examples, the default redundancy configuration manager 850 may be configured as or otherwise support a means for transmitting, to the receiving device, the second one or more data packets based on the network encoding according to the default redundancy configuration, where the one or more messages include feedback information associated with the second one or more data packets. In some examples, the default redundancy configuration manager 850 may be configured as or otherwise support a means for adjusting the default redundancy configuration by an offset value based on receiving the feedback information, where the first receiver-specific redundancy configuration corresponds to the default redundancy configuration adjusted by the offset value.

In some examples, the one or more messages include one or more parameters including the default redundancy configuration, the offset value, a threshold redundancy configuration, or any combination thereof.

In some examples, the redundancy configuration manager 830 may be configured as or otherwise support a means for transmitting, to the receiving device, control signaling including an indication of one or more parameters, where the one or more messages include control signaling including a request from the receiving device that the transmitting device network encode the one or more data packets according to the first receiver-specific redundancy configuration.

In some examples, to support transmitting the control signaling including the indication of the one or more parameters, the redundancy configuration manager 830 may be configured as or otherwise support a means for transmitting, to the receiving device, a radio resource control message including a set of multiple parameters including the one or more parameters. In some examples, to support transmitting the control signaling including the indication of the one or more parameters, the redundancy configuration manager 830 may be configured as or otherwise support a means for transmitting, to the receiving device, a downlink control information message including an indication of a subset of the set of multiple parameters, the subset including the one or more parameters.

In some examples, the redundancy procedure activation manager 855 may be configured as or otherwise support a means for transmitting, to the receiving device based on determining that one or more conditions are satisfied, control signaling activating receiver-specific redundancy procedures, where receiving the control signaling including the request is based on transmitting the control signaling activating the first receiver-specific redundancy procedures.

In some examples, the one or more conditions include a threshold amount of available downlink resources or uplink resources or both, a threshold quality level of the link between the transmitting device and the receiving device, a processing capability of the receiving device, a processing capability of the transmitting device, or any combination thereof.

In some examples, a packet loss probability report, where network encoding the one or more data packets according to the first receiver-specific redundancy configuration is based on receiving, from the receiving device, the packet loss probability report.

In some examples, to support receiving the control signaling including the indication of one or more parameters for performing receiver-specific network encoding, the redundancy parameter manager 860 may be configured as or otherwise support a means for receiving, from the receiving device, a radio resource control message including a set of multiple parameters including the one or more parameters. In some examples, to support receiving the control signaling including the indication of one or more parameters for performing receiver-specific network encoding, the redundancy parameter manager 860 may be configured as or otherwise support a means for receiving, from the receiving device, a downlink control information message including an indication of a subset of the set of multiple parameters, the subset including the one or more parameters.

In some examples, to support one or more messages, the network encoding manager 835 may be configured as or otherwise support a means for control signaling received from the receiving device including an instruction to network encode the one or more data packets according to the first receiver-specific redundancy configuration.

In some examples, the redundancy procedure activation manager 855 may be configured as or otherwise support a means for receiving, from the receiving device, control signaling activating receiver-specific redundancy procedures, where network encoding the one or more data packets according to the first receiver-specific redundancy configuration is based on receiving the control signaling activating the first receiver-specific redundancy procedures.

In some examples, the redundancy procedure activation manager 855 may be configured as or otherwise support a means for receiving, from the receiving device, control signaling deactivating receiver-specific redundancy procedures. In some examples, the redundancy procedure activation manager 855 may be configured as or otherwise support a means for network encoding a second one or more data packets according to a default redundancy that is not receiver-specific based on receiving the control signaling deactivating receiver-specific redundancy procedures. In some examples, the redundancy procedure activation manager 855 may be configured as or otherwise support a means for transmitting the second one or more data packets to the receiving device based on the network encoding according to the default redundancy.

Additionally, or alternatively, the communications manager 820 may support wireless communications at a receiving device in accordance with examples as disclosed herein. In some examples, the link quality manager 825 may be configured as or otherwise support a means for determining a quality level of a link between a transmitting device and the receiving device based on one or more messages communicated over the link. In some examples, the redundancy configuration manager 830 may be configured as or otherwise support a means for receiving, from the transmitting device via the link, one or more data packets that are network encoded according to a first receiver-specific redundancy configuration of a set of multiple redundancy configurations corresponding to the quality level. The network decoding manager 840 may be configured as or otherwise support a means for network decoding the one or more data packets based on the first receiver-specific redundancy configuration.

In some examples, the packet loss probability report manager 845 may be configured as or otherwise support a means for transmitting, to the transmitting device, a packet loss probability report, where the one or more messages include one or more downlink data packets transmitted during a packet loss measurement window, where the first receiver-specific redundancy configuration is associated with a packet loss probability for the packet loss measurement window indicated in the packet loss probability report.

In some examples, the redundancy parameter manager 860 may be configured as or otherwise support a means for receiving, from the transmitting device, control signaling including an indication of one or more parameters for estimating the quality level of the link between the receiving device and the transmitting device, where the one or more parameters include the packet loss measurement window.

In some examples, the default redundancy configuration manager 850 may be configured as or otherwise support a means for receiving, from the transmitting device, a second one or more data packets that are network encoded according to a default redundancy configuration of the set of multiple redundancy configurations, where the one or more messages include feedback information associated with the second one or more data packets, and where the first receiver-specific redundancy configuration includes the default redundancy configuration adjusted by an offset value.

In some examples, the redundancy parameter manager 860 may be configured as or otherwise support a means for receiving, from the transmitting device, control signaling including an indication of one or more parameters for estimating the quality level of the link between the receiving device and the transmitting device, where the one or more messages include control signaling including a request that the transmitting device network encode the one or more data packets according to the first receiver-specific redundancy configuration based on receiving the indication of the one or more parameters, and where the one or more parameters include a packet loss measurement window, a lookup table indicating a correspondence between packet loss values and respective redundancy configurations of the set of redundancy configurations, or both.

In some examples, to support receiving the control signaling including the indication of the one or more parameters, the redundancy parameter manager 860 may be configured as or otherwise support a means for receiving, from the transmitting device, a radio resource control message including a set of multiple parameters including the one or more parameters. In some examples, to support receiving the control signaling including the indication of the one or more parameters, the redundancy parameter manager 860 may be configured as or otherwise support a means for receiving, from the transmitting device, a downlink control information message including an indication of a subset of the set of multiple parameters, the subset including the one or more parameters.

In some examples, the redundancy procedure activation manager 855 may be configured as or otherwise support a means for receiving, from the transmitting device, control signaling activating receiver-specific redundancy procedures, where transmitting the control signaling including the request is based on receiving the control signaling activating the first receiver-specific redundancy procedures.

In some examples, the packet loss probability report manager 845 may be configured as or otherwise support a means for transmitting, to the transmitting device, a packet loss probability report, where receiving the one or more data packets that are network encoded according to the first receiver-specific redundancy configuration is based on transmitting the packet loss probability report.

In some examples, the default redundancy configuration manager 850 may be configured as or otherwise support a means for receiving, from the transmitting device, a second one or more data packets that are network encoded according to a default redundancy configuration, where the one or more messages include feedback information associated with the second one or more data packets, and where the first receiver-specific redundancy configuration includes the default redundancy configuration adjusted by an offset value based on the feedback information.

In some examples, to support one or more messages, the network encoding manager 835 may be configured as or otherwise support a means for control signaling transmitted to the transmitting device including an instruction to network encode the one or more data packets according to the first receiver-specific redundancy configuration.

In some examples, the redundancy procedure activation manager 855 may be configured as or otherwise support a means for transmitting, to the transmitting device, control signaling activating receiver-specific redundancy procedures based on one or more conditions being satisfied, where receiving the one or more data packets that are network encoded according to the first receiver-specific redundancy configuration is based on receiving the control signaling activating the first receiver-specific redundancy procedures.

In some examples, the one or more conditions include a threshold amount of available downlink resources or uplink resources or both, a threshold quality level of the link between the transmitting device and the receiving device, a processing capability of the receiving device, a processing capability of the transmitting device, or any combination thereof.

Figure 9:
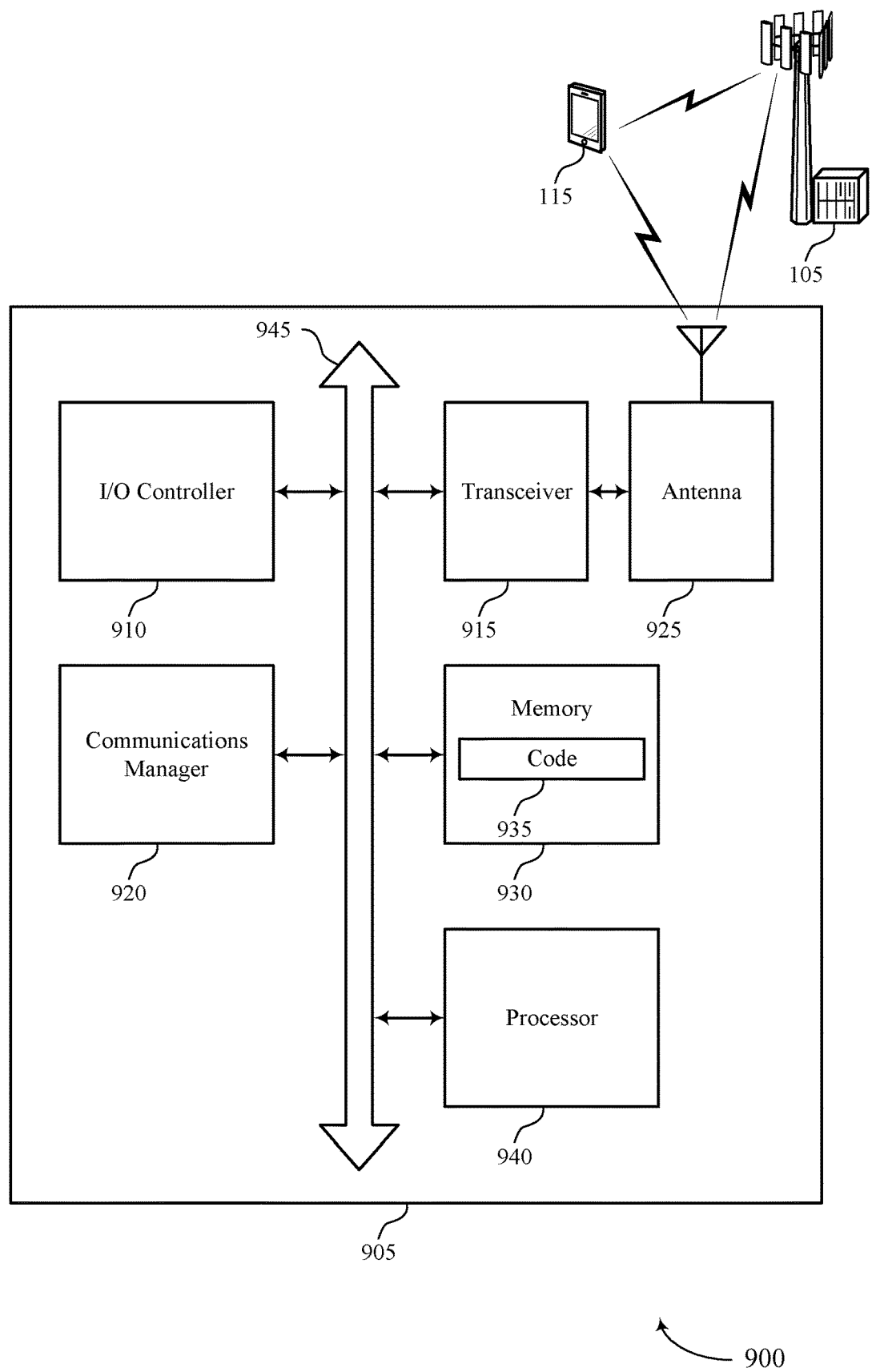
FIG. 9 shows a diagram of a system including a base station that supports techniques for receiver-specific network coding redundancy in accordance with aspects of the present disclosure.

FIG. 9 shows a diagram of a system 900 including a device 905 that supports techniques for receiver-specific network coding redundancy in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for receiver-specific network coding redundancy). For example, the device 905 or a component of the device 905 may include a processor 940 and memory 930 coupled to the processor 940, the processor 940 and memory 930 configured to perform various functions described herein.

The communications manager 920 may support wireless communications at a transmitting device in accordance with examples as disclosed herein. For example, the communications manager 920 may be configured as or otherwise support a means for determining a quality level of a link between the transmitting device and a receiving device based on one or more messages communicated over the link. The communications manager 920 may be configured as or otherwise support a means for selecting a first receiver-specific redundancy configuration of a set of multiple redundancy configurations based on the quality level. The communications manager 920 may be configured as or otherwise support a means for network encoding one or more data packets for transmission to the receiving device according to the first receiver-specific redundancy configuration. The communications manager 920 may be configured as or otherwise support a means for transmitting, to the receiving device, the one or more data packets based on the network encoding.

Additionally, or alternatively, the communications manager 920 may support wireless communications at a receiving device in accordance with examples as disclosed herein. For example, the communications manager 920 may be configured as or otherwise support a means for determining a quality level of a link between a transmitting device and the receiving device based on one or more messages communicated over the link. The communications manager 920 may be configured as or otherwise support a means for receiving, from the transmitting device via the link, one or more data packets that are network encoded according to a first receiver-specific redundancy configuration of a set of multiple redundancy configurations corresponding to the quality level. The communications manager 920 may be configured as or otherwise support a means for network decoding the one or more data packets based on the first receiver-specific redundancy configuration.

By including or configuring the communications manager 920 in accordance with examples as described herein, the device 905 may support techniques for user-specific network encoding and transmission, resulting in more efficient use of available resources, decreased signaling overhead, decreased system latency, and improved user experience In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for receiver-specific network coding redundancy as described herein, or the processor 940 and the memory 930 may be otherwise configured to perform or support such operations.

Figure 10:
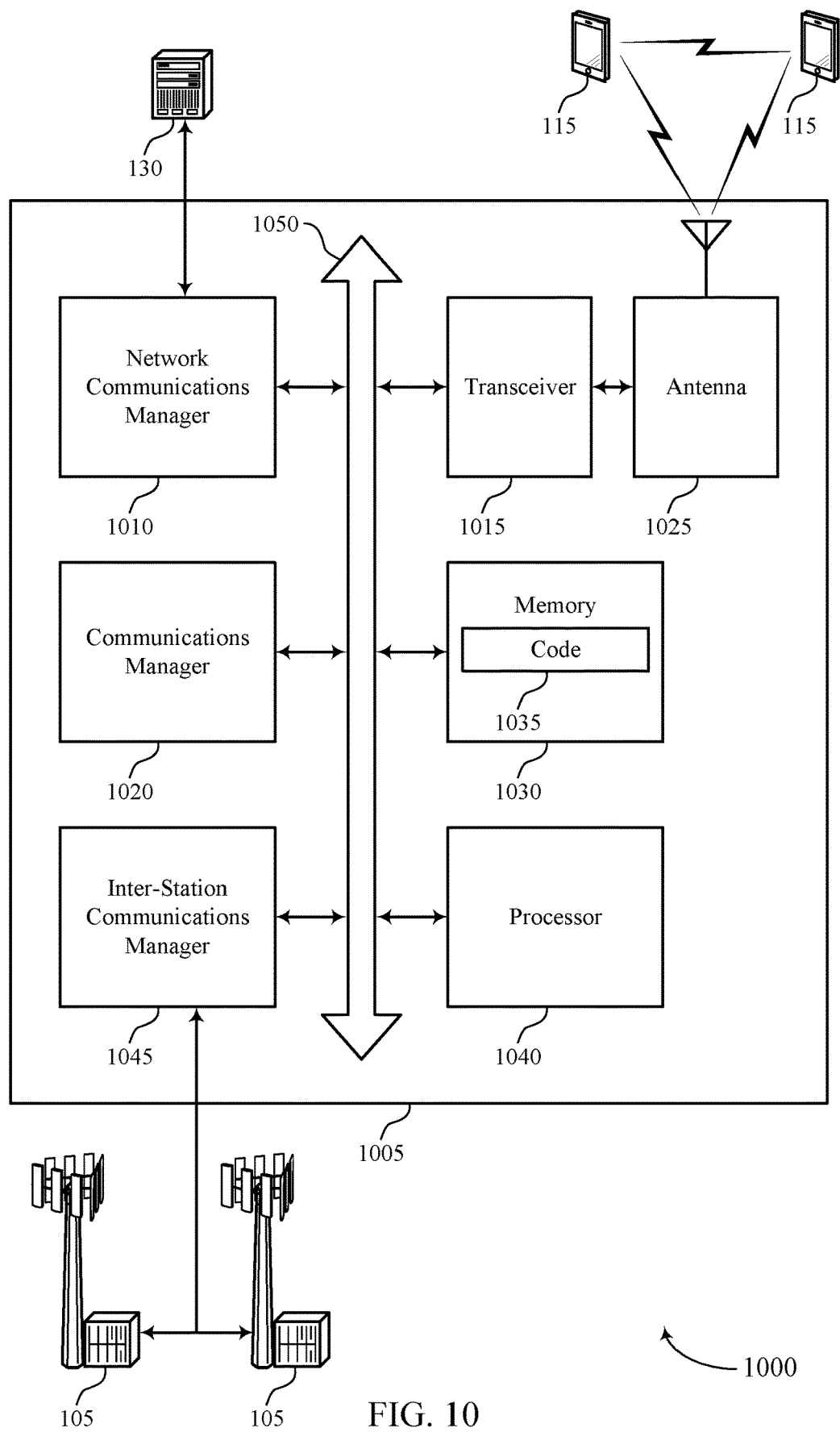
FIG. 10 shows a diagram of a system including a UE that supports techniques for receiver-specific network coding redundancy in accordance with aspects of the present disclosure.

FIG. 10 shows a diagram of a system 1000 including a device 1005 that supports techniques for receiver-specific network coding redundancy in accordance with aspects of the present disclosure. The device 1005 may be an example of or include the components of a device 605, a device 705, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 615, a transmitter 715, a receiver 610, a receiver 710, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for receiver-specific network coding redundancy). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communications at a transmitting device in accordance with examples as disclosed herein. For example, the communications manager 1020 may be configured as or otherwise support a means for determining a quality level of a link between the transmitting device and a receiving device based on one or more messages communicated over the link. The communications manager 1020 may be configured as or otherwise support a means for selecting a first receiver-specific redundancy configuration of a set of multiple redundancy configurations based on the quality level. The communications manager 1020 may be configured as or otherwise support a means for network encoding one or more data packets for transmission to the receiving device according to the first receiver-specific redundancy configuration. The communications manager 1020 may be configured as or otherwise support a means for transmitting, to the receiving device, the one or more data packets based on the network encoding.

Additionally, or alternatively, the communications manager 1020 may support wireless communications at a receiving device in accordance with examples as disclosed herein. For example, the communications manager 1020 may be configured as or otherwise support a means for determining a quality level of a link between a transmitting device and the receiving device based on one or more messages communicated over the link. The communications manager 1020 may be configured as or otherwise support a means for receiving, from the transmitting device via the link, one or more data packets that are network encoded according to a first receiver-specific redundancy configuration of a set of multiple redundancy configurations corresponding to the quality level. The communications manager 1020 may be configured as or otherwise support a means for network decoding the one or more data packets based on the first receiver-specific redundancy configuration.

By including or configuring the communications manager 1020 in accordance with examples as described herein, the device 1005 may support techniques for user-specific network encoding, resulting in more efficient use of available system resources, decreased signaling overhead, decreased latency, more reliable communications, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for receiver-specific network coding redundancy as described herein, or the processor 1040 and the memory 1030 may be otherwise configured to perform or support such operations.

Figure 11:
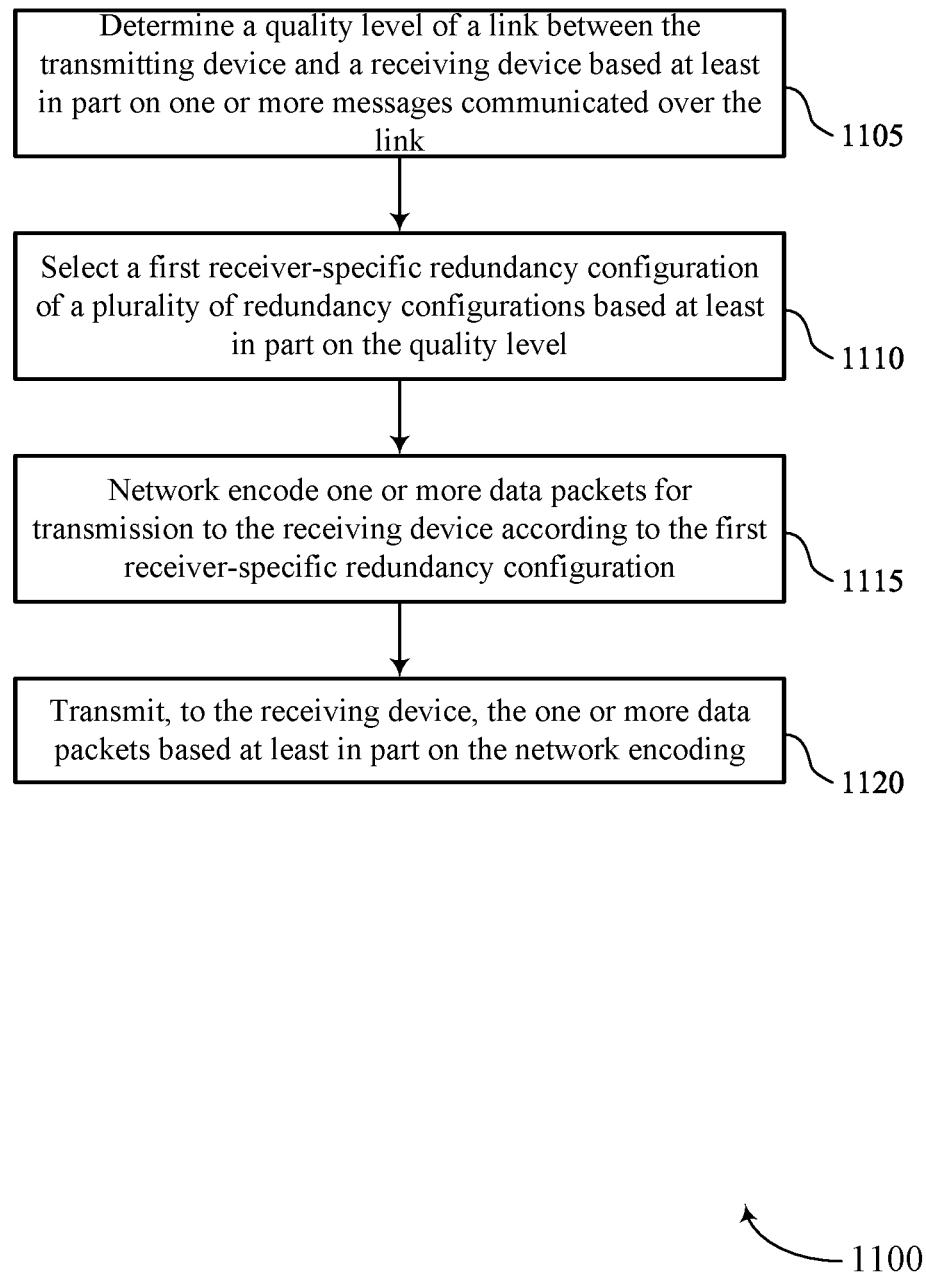
FIGS. 11 through 14 show flowcharts illustrating methods that support techniques for receiver-specific network coding redundancy in accordance with aspects of the present disclosure.

FIG. 11 shows a flowchart illustrating a method 1100 that supports techniques for receiver-specific network coding redundancy in accordance with aspects of the present disclosure. The operations of the method 1100 may be implemented by a UE or its components or a base station and its components, as described herein. For example, the operations of the method 1100 may be performed by a UE or a base station, as described with reference to FIGS. 1-10. In some examples, the base station or the UE may execute a set of instructions to control the functional elements of to perform the described functions. Additionally, or alternatively, the UE or the base station may perform aspects of the described functions using special-purpose hardware.

At 1105, the method may include determining a quality level of a link between the transmitting device and a receiving device based on one or more messages communicated over the link. The operations of 1105 may be performed in accordance with examples as disclosed herein. In some examples, aspects of the operations of 1105 may be performed by a link quality manager 825 as described with reference to FIG. 8.

At 1110, the method may include selecting a first receiver-specific redundancy configuration of a set of multiple redundancy configurations based on the quality level. The operations of 1110 may be performed in accordance with examples as disclosed herein. In some examples, aspects of the operations of 1110 may be performed by a redundancy configuration manager 830, as described with reference to FIG. 8.

At 1115, the method may include network encoding one or more data packets for transmission to the receiving device according to the first receiver-specific redundancy configuration. The operations of 1115 may be performed in accordance with examples as disclosed herein. In some examples, aspects of the operations of 1115 may be performed by a network encoding manager 835, as described with reference to FIG. 8.

At 1120, the method may include transmitting, to the receiving device, the one or more data packets based on the network encoding. The operations of 1120 may be performed in accordance with examples as disclosed herein. In some examples, aspects of the operations of 1105 may be performed by a network encoding manager 835 as described with reference to FIG. 8.

Figure 12:
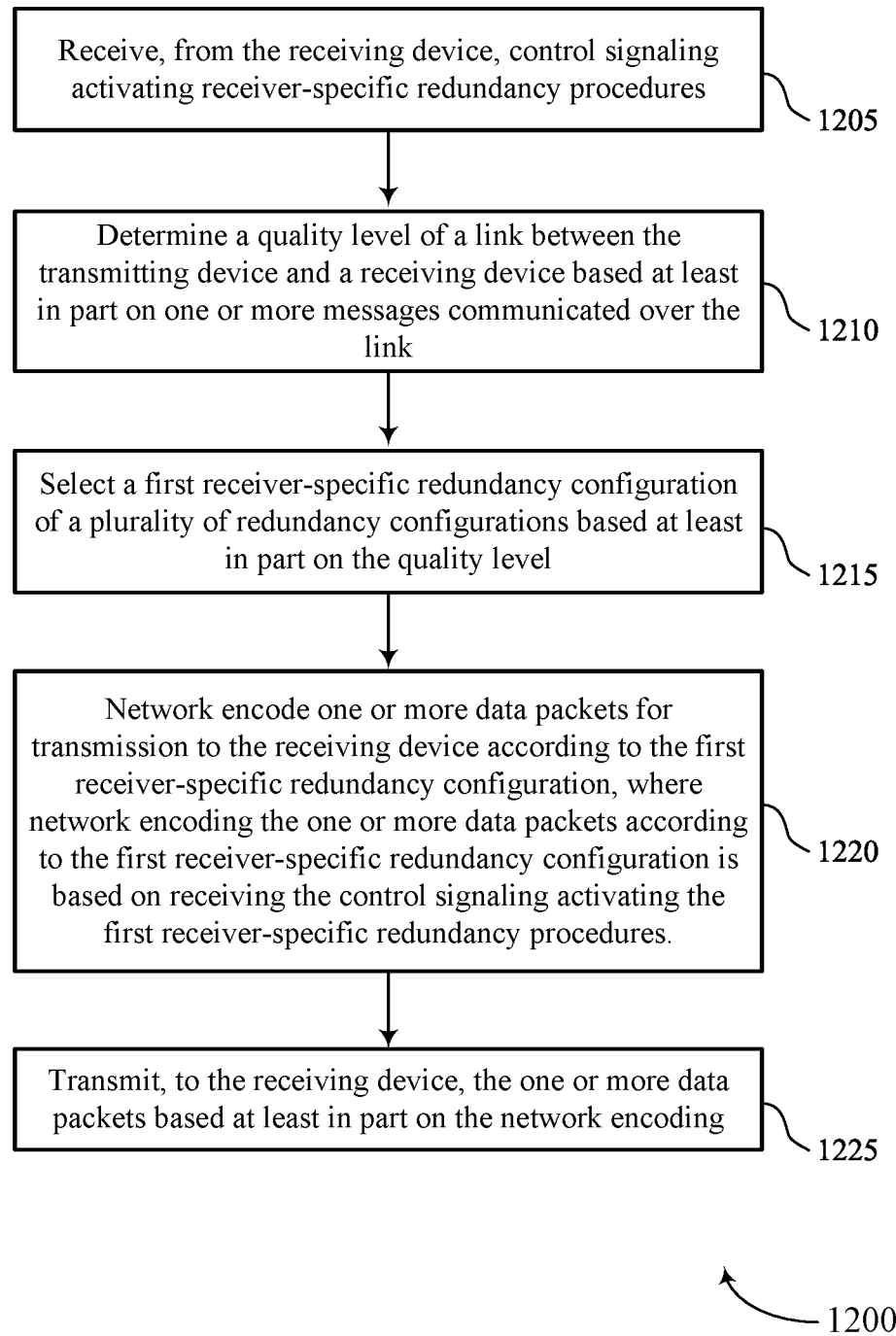

FIG. 12 shows a flowchart illustrating a method 1200 that supports techniques for receiver-specific network coding redundancy in accordance with aspects of the present disclosure. The operations of the method 1200 may be implemented by a base station or its components or a UE and its component devices as described herein. For example, the operations of the method 1200 may be performed by a UE or a base station, as described with reference to FIGS. 1-9. In some examples, the base station or the UE may execute a set of instructions to control the functional elements of to perform the described functions. Additionally, or alternatively, may perform aspects of the described functions using special-purpose hardware.

At 1205, the method may include receiving, from the receiving device, control signaling activating receiver-specific redundancy procedures. The operations of 1205 may be performed in accordance with examples as disclosed herein. In some examples, aspects of the operations of 1205 may be performed by redundancy procedure activation manager 830, as described with reference to FIG. 8.

At 1210, the method may include determining a quality level of a link between the transmitting device and a receiving device based on one or more messages communicated over the link. The operations of 1210 may be performed in accordance with examples as disclosed herein. In some examples, aspects of the operations of 1210 may be performed by a link quality manager 825, as described with reference to FIG. 8.

At 1215, the method may include selecting a first receiver-specific redundancy configuration of a set of multiple redundancy configurations based on the quality level. The operations of 1215 may be performed in accordance with examples as disclosed herein. In some examples, aspects of the operations of 1215 may be performed by a redundancy configuration manager 830, as described with reference to FIG. 8.

At 1220, the method may include network encoding one or more data packets for transmission to the receiving device according to the first receiver-specific redundancy configuration, where network encoding the one or more data packets according to the first receiver-specific redundancy configuration is based on receiving the control signaling activating the first receiver-specific redundancy procedures. The operations of 1220 may be performed in accordance with examples as disclosed herein. In some examples, aspects of the operations of 1220 may be performed by a network encoding manager 835, as described with reference to FIG. 8.

At 1225, the method may include transmitting, to the receiving device, the one or more data packets based on the network encoding. The operations of 1225 may be performed in accordance with examples as disclosed herein. In some examples, aspects of the operations of 1225 may be performed by a redundancy configuration manager 830, as described with reference to FIG. 8.

Figure 13:
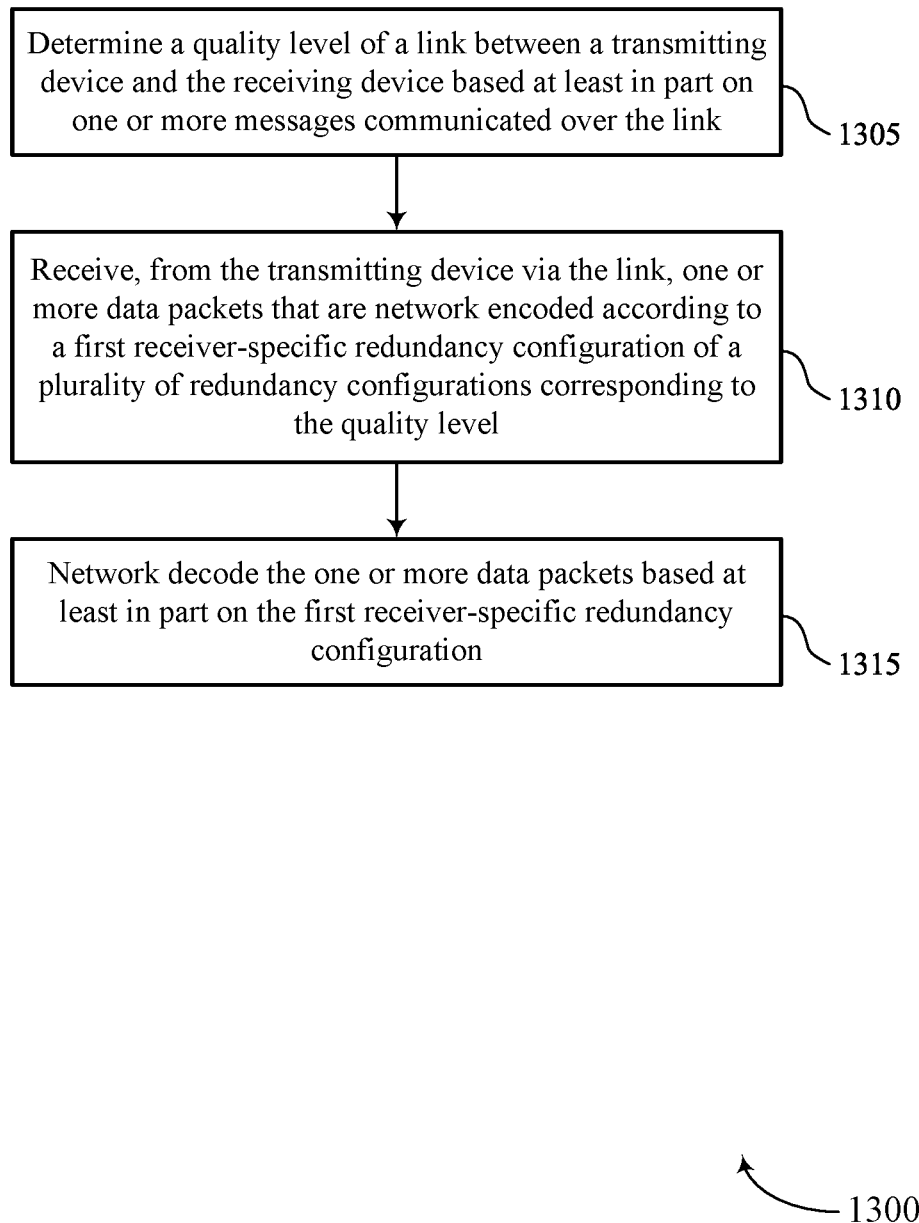

FIG. 13 shows a flowchart illustrating a method 1300 that supports techniques for receiver-specific network coding redundancy in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 10. In some examples, a UE or a base station may execute a set of instructions to control the functional elements of the UE or the base station to perform the described functions. Additionally, or alternatively, the UE or the base station may perform aspects of the described functions using special-purpose hardware.

At 1305, the method may include determining a quality level of a link between a transmitting device and the receiving device based on one or more messages communicated over the link. The operations of 1305 may be performed in accordance with examples as disclosed herein. In some examples, aspects of the operations of 1305 may be performed by a link quality manager 825 as described with reference to FIG. 8.

At 1310, the method may include receiving, from the transmitting device via the link, one or more data packets that are network encoded according to a first receiver-specific redundancy configuration of a set of multiple redundancy configurations corresponding to the quality level. The operations of 1310 may be performed in accordance with examples as disclosed herein. In some examples, aspects of the operations of 1310 may be performed by a redundancy configuration manager 830 as described with reference to FIG. 8.

At 1315, the method may include network decoding the one or more data packets based on the first receiver-specific redundancy configuration. The operations of 1315 may be performed in accordance with examples as disclosed herein. In some examples, aspects of the operations of 1315 may be performed by a network decoding manager 840 as described with reference to FIG. 8.

Figure 14:
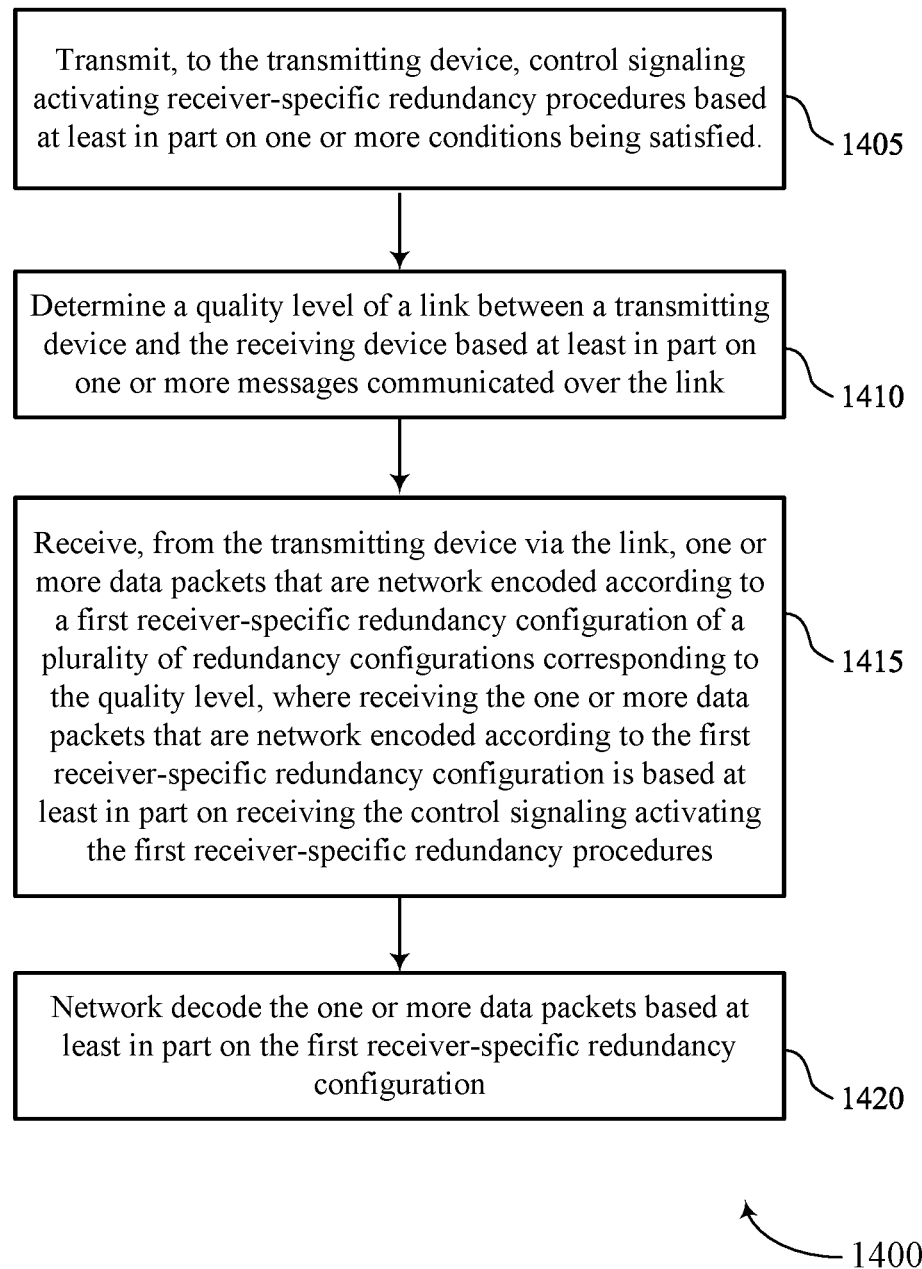

FIG. 14 shows a flowchart illustrating a method 1400 that supports techniques for receiver-specific network coding redundancy in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 10. In some examples, a UE or a base station may execute a set of instructions to control the functional elements of the UE or the base station to perform the described functions. Additionally, or alternatively, the UE or the base station may perform aspects of the described functions using special-purpose hardware.

At 1405, the method may include transmitting, to the transmitting device, control signaling activating receiver-specific redundancy procedures based on one or more conditions being satisfied. The operations of 1405 may be performed in accordance with examples as disclosed herein. In some examples, aspects of the operations of 1405 may be performed by a redundancy procedure activation manager 855 as described with reference to FIG. 8.

At 1410, the method may include determining a quality level of a link between a transmitting device and the receiving device based on one or more messages communicated over the link. The operations of 1410 may be performed in accordance with examples as disclosed herein. In some examples, aspects of the operations of 1410 may be performed by a link quality manager 825 as described with reference to FIG. 8.

At 1415, the method may include receiving, from the transmitting device via the link, one or more data packets that are network encoded according to a first receiver-specific redundancy configuration of a set of multiple redundancy configurations corresponding to the quality level, where receiving the one or more data packets that are network encoded according to the first receiver-specific redundancy configuration is based on receiving the control signaling activating the first receiver-specific redundancy procedures. The operations of 1415 may be performed in accordance with examples as disclosed herein. In some examples, aspects of the operations of 1415 may be performed by a redundancy configuration manager 830 as described with reference to FIG. 8.

At 1420, the method may include network decoding the one or more data packets based on the first receiver-specific redundancy configuration. The operations of 1420 may be performed in accordance with examples as disclosed herein. In some examples, aspects of the operations of 1420 may be performed by a network decoding manager 840 as described with reference to FIG. 8.

The following provides an overview of aspects of the present disclosure:

Aspect 1: A method for wireless communications at a transmitting device, comprising: determining a quality level of a link between the transmitting device and a receiving device based at least in part on one or more messages communicated over the link; selecting a first receiver-specific redundancy configuration of a plurality of redundancy configurations based at least in part on the quality level; network encoding one or more data packets for transmission to the receiving device according to the first receiver-specific redundancy configuration; and transmitting, to the receiving device, the one or more data packets based at least in part on the network encoding.

Aspect 2: The method of aspect 1, further comprising: receiving, from the receiving device, a packet loss probability report based at least in part on transmitting the one or more messages to the receiving device, wherein the one or more messages comprise one or more downlink data packets transmitted during a packet loss measurement window.

Aspect 3: The method of any of aspects 1 through 2, further comprising: network encoding a second one or more data packets for transmission to the receiving device according to a default redundancy configuration of the plurality of redundancy configurations; transmitting, to the receiving device, the second one or more data packets based at least in part on the network encoding according to the default redundancy configuration, wherein the one or more messages comprise feedback information associated with the second one or more data packets; and adjusting the default redundancy configuration by an offset value based at least in part on receiving the feedback information, wherein the first receiver-specific redundancy configuration corresponds to the default redundancy configuration adjusted by the offset value.

Aspect 4: The method of aspect 3, wherein the one or more messages comprise one or more parameters comprising the default redundancy configuration, the offset value, a threshold redundancy configuration, or any combination thereof.

Aspect 5: The method of any of aspects 1 through 4, further comprising: transmitting, to the receiving device, control signaling comprising an indication of one or more parameters, wherein the one or more messages comprise control signaling comprising a request from the receiving device that the transmitting device network encode the one or more data packets according to the first receiver-specific redundancy configuration.

Aspect 6: The method of aspect 5, wherein transmitting the control signaling comprising the indication of the one or more parameters comprises: transmitting, to the receiving device, a radio resource control message comprising a plurality of parameters comprising the one or more parameters; and transmitting, to the receiving device, a downlink control information message comprising an indication of a subset of the plurality of parameters, the subset comprising the one or more parameters.

Aspect 7: The method of any of aspects 5 through 6, further comprising: transmitting, to the receiving device based at least in part on determining that one or more conditions are satisfied, control signaling activating receiver-specific redundancy procedures, wherein receiving the control signaling comprising the request is based at least in part on transmitting the control signaling activating the first receiver-specific redundancy procedures.

Aspect 8: The method of aspect 7, wherein the one or more conditions comprise a threshold amount of available downlink resources or uplink resources or both, a threshold quality level of the link between the transmitting device and the receiving device, a processing capability of the receiving device, a processing capability of the transmitting device, or any combination thereof.

Aspect 9: The method of any of aspects 1 through 8, wherein the one or more messages comprise a packet loss probability report, wherein network encoding the one or more data packets according to the first receiver-specific redundancy configuration is based at least in part on receiving, from the receiving device, the packet loss probability report.

Aspect 10: The method of aspect 9, wherein receiving the control signaling comprising the indication of one or more parameters for performing receiver-specific network encoding comprises: receiving, from the receiving device, a radio resource control message comprising a plurality of parameters comprising the one or more parameters; and receiving, from the receiving device, a downlink control information message comprising an indication of a subset of the plurality of parameters, the subset comprising the one or more parameters.

Aspect 11: The method of any of aspects 1 through 10, wherein the one or more messages comprises: control signaling received from the receiving device comprising an instruction to network encode the one or more data packets according to the first receiver-specific redundancy configuration.

Aspect 12: The method of any of aspects 1 through 11, further comprising: receiving, from the receiving device, control signaling activating receiver-specific redundancy procedures, wherein network encoding the one or more data packets according to the first receiver-specific redundancy configuration is based at least in part on receiving the control signaling activating the first receiver-specific redundancy procedures.

Aspect 13: The method of aspect 12, further comprising: receiving, from the receiving device, control signaling deactivating receiver-specific redundancy procedures; network encoding a second one or more data packets according to a default redundancy that is not receiver-specific based at least in part on receiving the control signaling deactivating receiver-specific redundancy procedures; and transmitting the second one or more data packets to the receiving device based at least in part on the network encoding according to the default redundancy.

Aspect 14: A method for wireless communications at a receiving device, comprising: determining a quality level of a link between a transmitting device and the receiving device based at least in part on one or more messages communicated over the link; receiving, from the transmitting device via the link, one or more data packets that are network encoded according to a first receiver-specific redundancy configuration of a plurality of redundancy configurations corresponding to the quality level; and network decoding the one or more data packets based at least in part on the first receiver-specific redundancy configuration.

Aspect 15: The method of aspect 14, further comprising: transmitting, to the transmitting device, a packet loss probability report, wherein the one or more messages comprise one or more downlink data packets transmitted during a packet loss measurement window, wherein the first receiver-specific redundancy configuration is associated with a packet loss probability for the packet loss measurement window indicated in the packet loss probability report.

Aspect 16: The method of aspect 15, further comprising: receiving, from the transmitting device, control signaling comprising an indication of one or more parameters for estimating the quality level of the link between the receiving device and the transmitting device, wherein the one or more parameters comprise the packet loss measurement window.

Aspect 17: The method of any of aspects 14 through 16, further comprising: receiving, from the transmitting device, a second one or more data packets that are network encoded according to a default redundancy configuration of the plurality of redundancy configurations, wherein the one or more messages comprise feedback information associated with the second one or more data packets, and wherein the first receiver-specific redundancy configuration comprises the default redundancy configuration adjusted by an offset value.

Aspect 18: The method of any of aspects 14 through 17, further comprising: receiving, from the transmitting device, control signaling comprising an indication of one or more parameters for estimating the quality level of the link between the receiving device and the transmitting device, wherein the one or more messages comprise control signaling comprising a request that the transmitting device network encode the one or more data packets according to the first receiver-specific redundancy configuration based at least in part on receiving the indication of the one or more parameters, and wherein the one or more parameters comprise a packet loss measurement window, a lookup table indicating a correspondence between packet loss values and respective redundancy configurations of the set of redundancy configurations, or both.

Aspect 19: The method of aspect 18, wherein receiving the control signaling comprising the indication of the one or more parameters comprises: receiving, from the transmitting device, a radio resource control message comprising a plurality of parameters comprising the one or more parameters; and receiving, from the transmitting device, a downlink control information message comprising an indication of a subset of the plurality of parameters, the subset comprising the one or more parameters.

Aspect 20: The method of any of aspects 18 through 19, further comprising: receiving, from the transmitting device, control signaling activating receiver-specific redundancy procedures, wherein transmitting the control signaling comprising the request is based at least in part on receiving the control signaling activating the first receiver-specific redundancy procedures.

Aspect 21: The method of any of aspects 14 through 20, further comprising: transmitting, to the transmitting device, a packet loss probability report, wherein receiving the one or more data packets that are network encoded according to the first receiver-specific redundancy configuration is based at least in part on transmitting the packet loss probability report.

Aspect 22: The method of any of aspects 14 through 21, further comprising: receiving, from the transmitting device, a second one or more data packets that are network encoded according to a default redundancy configuration, wherein the one or more messages comprise feedback information associated with the second one or more data packets, and wherein the first receiver-specific redundancy configuration comprises the default redundancy configuration adjusted by an offset value based at least in part on the feedback information.

Aspect 23: The method of any of aspects 14 through 22, wherein the one or more messages comprises: control signaling transmitted to the transmitting device comprising an instruction to network encode the one or more data packets according to the first receiver-specific redundancy configuration.

Aspect 24: The method of any of aspects 14 through 23, further comprising: transmitting, to the transmitting device, control signaling activating receiver-specific redundancy procedures based at least in part on one or more conditions being satisfied, wherein receiving the one or more data packets that are network encoded according to the first receiver-specific redundancy configuration is based at least in part on receiving the control signaling activating the first receiver-specific redundancy procedures.

Aspect 25: The method of aspect 24, wherein the one or more conditions comprise a threshold amount of available downlink resources or uplink resources or both, a threshold quality level of the link between the transmitting device and the receiving device, a processing capability of the receiving device, a processing capability of the transmitting device, or any combination thereof.

Aspect 26: An apparatus for wireless communications at a transmitting device, comprising a processor; memory coupled with the processor; and instructions stored in the memory and executable by the processor to cause the apparatus to perform a method of any of aspects 1 through 13.

Aspect 27: An apparatus for wireless communications at a transmitting device, comprising at least one means for performing a method of any of aspects 1 through 13.

Aspect 28: A non-transitory computer-readable medium storing code for wireless communications at a transmitting device, the code comprising instructions executable by a processor to perform a method of any of aspects 1 through 13.

Aspect 29: An apparatus for wireless communications at a receiving device, comprising a processor; memory coupled with the processor; and instructions stored in the memory and executable by the processor to cause the apparatus to perform a method of any of aspects 14 through 25.

Aspect 30: An apparatus for wireless communications at a receiving device, comprising at least one means for performing a method of any of aspects 14 through 25.

Aspect 31: A non-transitory computer-readable medium storing code for wireless communications at a receiving device, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a transmitting device, comprising:
   determining a quality level of a link between the transmitting device and a receiving device based at least in part on one or more messages communicated over the link;
   selecting a first receiver-specific redundancy configuration of a plurality of redundancy configurations based at least in part on the quality level, wherein the first receiver-specific redundancy configuration indicates a quantity of network-encoded symbols for network encoding of one or more data packets for transmission to the receiving device;
   network encoding the one or more data packets for transmission to the receiving device according to the quantity of network-encoded symbols of the first receiver-specific redundancy configuration; and
   transmitting, to the receiving device, the one or more data packets based at least in part on the network encoding.

2. The method of claim 1, further comprising:
   receiving, from the receiving device, a packet loss probability report based at least in part on transmitting the one or more messages to the receiving device, wherein the one or more messages comprise one or more downlink data packets transmitted during a packet loss measurement window.

3. The method of claim 1, further comprising:
   network encoding a second one or more data packets for transmission to the receiving device according to a default redundancy configuration of the plurality of redundancy configurations;

transmitting, to the receiving device, the second one or more data packets based at least in part on the network encoding according to the default redundancy configuration, wherein the one or more messages comprise feedback information associated with the second one or more data packets; and adjusting the default redundancy configuration by an offset value based at least in part on receiving the feedback information, wherein the first receiver-specific redundancy configuration corresponds to the default redundancy configuration adjusted by the offset value.

4. The method of claim 3, wherein the one or more messages comprise one or more parameters comprising the default redundancy configuration, the offset value, a threshold redundancy configuration, or any combination thereof.

5. The method of claim 1, further comprising:
transmitting, to the receiving device, control signaling comprising an indication of one or more parameters, wherein the one or more messages comprise control signaling comprising a request from the receiving device that the transmitting device network encode the one or more data packets according to the first receiver-specific redundancy configuration.

6. The method of claim 5, wherein transmitting the control signaling comprising the indication of the one or more parameters comprises:
transmitting, to the receiving device, a radio resource control message comprising a plurality of parameters comprising the one or more parameters; and
transmitting, to the receiving device, a downlink control information message comprising an indication of a subset of the plurality of parameters, the subset comprising the one or more parameters.

7. The method of claim 5, further comprising:
transmitting, to the receiving device based at least in part on determining that one or more conditions are satisfied, control signaling activating receiver-specific redundancy procedures, wherein receiving the control signaling comprising the request is based at least in part on transmitting the control signaling activating the receiver-specific redundancy procedures.

8. The method of claim 7, wherein the one or more conditions comprise a threshold amount of available downlink resources or uplink resources or both, a threshold quality level of the link between the transmitting device and the receiving device, a processing capability of the receiving device, a processing capability of the transmitting device, or any combination thereof.

9. The method of claim 1, wherein the one or more messages comprise a packet loss probability report, wherein network encoding the one or more data packets according to the first receiver-specific redundancy configuration is based at least in part on receiving, from the receiving device, the packet loss probability report.

10. The method of claim 1, wherein the one or more messages comprises:
control signaling received from the receiving device comprising an instruction to network encode the one or more data packets according to the first receiver-specific redundancy configuration.

11. The method of claim 1, further comprising:
receiving, from the receiving device, control signaling activating receiver-specific redundancy procedures, wherein network encoding the one or more data packets according to the first receiver-specific redundancy configuration is based at least in part on receiving the control signaling activating the receiver-specific redundancy procedures.

12. The method of claim 11, further comprising:
receiving, from the receiving device, control signaling deactivating receiver-specific redundancy procedures;
network encoding a second one or more data packets according to a default redundancy that is not receiver-specific based at least in part on receiving the control signaling deactivating receiver-specific redundancy procedures; and
transmitting the second one or more data packets to the receiving device based at least in part on the network encoding according to the default redundancy.

13. A method for wireless communications at a receiving device, comprising:
determining a quality level of a link between a transmitting device and the receiving device based at least in part on one or more messages communicated over the link;
receiving, from the transmitting device via the link, one or more data packets that are network encoded according to a first receiver-specific redundancy configuration of a plurality of redundancy configurations corresponding to the quality level, wherein the first receiver-specific redundancy configuration indicates a quantity of network-encoded symbols for network encoding of the one or more data packets for transmission; and
network decoding the one or more data packets based at least in part on the first receiver-specific redundancy configuration.

14. The method of claim 13, further comprising:
transmitting, to the transmitting device, a packet loss probability report, wherein the one or more messages comprise one or more downlink data packets transmitted during a packet loss measurement window, wherein the first receiver-specific redundancy configuration is associated with a packet loss probability for the packet loss measurement window indicated in the packet loss probability report.

15. The method of claim 14, further comprising:
receiving, from the transmitting device, control signaling comprising an indication of one or more parameters for estimating the quality level of the link between the receiving device and the transmitting device, wherein the one or more parameters comprise the packet loss measurement window.

16. The method of claim 13, further comprising:
receiving, from the transmitting device, a second one or more data packets that are network encoded according to a default redundancy configuration of the plurality of redundancy configurations, wherein the one or more messages comprise feedback information associated with the second one or more data packets, and wherein the first receiver-specific redundancy configuration comprises the default redundancy configuration adjusted by an offset value.

17. The method of claim 13, further comprising:
receiving, from the transmitting device, control signaling comprising an indication of one or more parameters for estimating the quality level of the link between the receiving device and the transmitting device, wherein the one or more messages comprise control signaling comprising a request that the transmitting device network encode the one or more data packets according to the first receiver-specific redundancy configuration based at least in part on receiving the indication of the one or more parameters, and wherein the one or more parameters comprise a packet loss measurement window, a lookup table indicating a correspondence between packet loss values and respective redundancy configurations of the plurality of redundancy configurations, or both.

18. The method of claim 17, wherein receiving the control signaling comprising the indication of the one or more parameters comprises:
receiving, from the transmitting device, a radio resource control message comprising a plurality of parameters comprising the one or more parameters; and
receiving, from the transmitting device, a downlink control information message comprising an indication of a subset of the plurality of parameters, the subset comprising the one or more parameters.

19. The method of claim 17, further comprising:
receiving, from the transmitting device, control signaling activating receiver-specific redundancy procedures, wherein transmitting the control signaling comprising the request is based at least in part on receiving the control signaling activating the receiver-specific redundancy procedures.

20. The method of claim 13, further comprising:
transmitting, to the transmitting device, a packet loss probability report, wherein receiving the one or more data packets that are network encoded according to the first receiver-specific redundancy configuration is based at least in part on transmitting the packet loss probability report.

21. The method of claim 13, further comprising:
receiving, from the transmitting device, a second one or more data packets that are network encoded according to a default redundancy configuration, wherein the one or more messages comprise feedback information associated with the second one or more data packets, and wherein the first receiver-specific redundancy configuration comprises the default redundancy configuration adjusted by an offset value based at least in part on the feedback information.

22. The method of claim 13, wherein the one or more messages comprises:
control signaling transmitted to the transmitting device comprising an instruction to network encode the one or more data packets according to the first receiver-specific redundancy configuration.

23. The method of claim 13, further comprising:
transmitting, to the transmitting device, control signaling activating receiver-specific redundancy procedures based at least in part on one or more conditions being satisfied, wherein receiving the one or more data packets that are network encoded according to the first receiver-specific redundancy configuration is based at least in part on receiving the control signaling activating the receiver-specific redundancy procedures.

24. The method of claim 23, wherein the one or more conditions comprise a threshold amount of available downlink resources or uplink resources or both, a threshold quality level of the link between the transmitting device and the receiving device, a processing capability of the receiving device, a processing capability of the transmitting device, or any combination thereof.

25. An apparatus for wireless communications at a transmitting device, comprising:
a processor;
memory coupled with the processor; and
instructions stored in the memory and executable by the processor to cause the apparatus to:
determine a quality level of a link between the transmitting device and a receiving device based at least in part on one or more messages communicated over the link;
select a first receiver-specific redundancy configuration of a plurality of redundancy configurations based at least in part on the quality level, wherein the first receiver-specific redundancy configuration indicates a quantity of network-encoded symbols for network encoding of one or more data packets for transmission to the receiving device;
network encode the one or more data packets for transmission to the receiving device according to the quantity of network-encoded symbols of the first receiver-specific redundancy configuration; and
transmit, to the receiving device, the one or more network encoded data packets.

26. The apparatus of claim 25, wherein the instructions are further executable by the processor to cause the apparatus to:
receive, from the receiving device, a packet loss probability report based at least in part on transmitting the one or more messages to the receiving device, wherein the one or more messages comprise one or more downlink data packets transmitted during a packet loss measurement window.

27. The apparatus of claim 25, wherein the instructions are further executable by the processor to cause the apparatus to:
network encode a second one or more data packets for transmission to the receiving device according to a default redundancy configuration of the plurality of redundancy configurations;
transmit, to the receiving device, the second one or more network encoded data packets, wherein the one or more messages comprise feedback information associated with the second one or more data packets; and
adjust the default redundancy configuration by an offset value based at least in part on receiving the feedback information, wherein the first receiver-specific redundancy configuration corresponds to the default redundancy configuration adjusted by the offset value.

28. An apparatus for wireless communications at a receiving device, comprising:
a processor;
memory coupled with the processor; and
instructions stored in the memory and executable by the processor to cause the apparatus to:
determine a quality level of a link between a transmitting device and the receiving device based at least in part on one or more messages communicated over the link;
receive, from the transmitting device via the link, one or more data packets that are network encoded according to a first receiver-specific redundancy configuration of a plurality of redundancy configurations corresponding to the quality level, wherein the first receiver-specific redundancy configuration indicates a quantity of network-encoded symbols for network encoding of the one or more data packets for transmission; and
network decode the one or more data packets based at least in part on the first receiver-specific redundancy configuration.

29. The apparatus of claim 28, wherein the instructions are further executable by the processor to cause the apparatus to:

transmit, to the transmitting device, a packet loss probability report, wherein the one or more messages comprise one or more downlink data packets transmitted during a packet loss measurement window, wherein the first receiver-specific redundancy configuration is associated with a packet loss probability for the packet loss measurement window indicated in the packet loss probability report.

* * * * *